(12) United States Patent
Singhal et al.

(10) Patent No.: US 11,893,792 B2
(45) Date of Patent: Feb. 6, 2024

(54) INTEGRATING VIDEO CONTENT INTO ONLINE PRODUCT LISTINGS TO DEMONSTRATE PRODUCT FEATURES

(71) Applicant: Adobe Inc., San Jose, CA (US)

(72) Inventors: Gourav Singhal, Delhi (IN); Sourabh Gupta, Noida (IN); Mrinal Kumar Sharma, Hazaribagh (IN)

(73) Assignee: Adobe Inc., San Jose, CA (US)

( * ) Notice: Subject to any disclaimer, the term of this patent is extended or adjusted under 35 U.S.C. 154(b) by 483 days.

(21) Appl. No.: 17/212,687

(22) Filed: Mar. 25, 2021

(65) Prior Publication Data
US 2022/0309280 A1     Sep. 29, 2022

(51) Int. Cl.
*G06V 20/40*     (2022.01)
*G06N 3/08*     (2023.01)
(Continued)

(52) U.S. Cl.
CPC ............ *G06V 20/46* (2022.01); *G06F 16/786* (2019.01); *G06F 16/7834* (2019.01);
(Continued)

(58) Field of Classification Search
CPC ........ G06V 20/46; G06V 20/41; G06V 10/82; G06V 20/49; G06V 10/764; G06V 10/454; G06V 2201/10; G06V 10/809; G06V 20/20; G06V 20/47; G06V 20/52; G06V 20/70; G06F 16/7834; G06F 16/7837; G06F 16/786; G06F 18/214; G06F 16/9535; G06F 18/24; G06F 18/217; G06F 18/2415; G06F 16/24578;
G06F 16/51; G06F 16/532; G06F 16/583; G06N 3/08; G06N 3/0464; G06N 3/09; G06N 3/045; G06Q 30/0623; G06Q 30/0277; G06Q 30/0251; G06Q 30/0625; G06T 2207/20084; G06T 2207/20081;
(Continued)

(56) References Cited

U.S. PATENT DOCUMENTS 9,953,222 B2 *  4/2018   Shetty ................... G06V 20/41
10,620,804 B2 *  4/2020   Moreau ............... G06F 3/04847
(Continued)

OTHER PUBLICATIONS

Senocak A. et al., "Learning to Localize Sound Source in Visual Scenes", arXiv:1803.03849v1, Mar. 10, 2018, 9 pages.
(Continued)

*Primary Examiner* — Michael S Osinski
(74) *Attorney, Agent, or Firm* — Finch & Maloney PLLC

(57) ABSTRACT

Techniques are disclosed for identifying and presenting video content that demonstrates features of a target product. The video content can be accessed, for example, from a media database of user-generated videos that demonstrate one or more features of the target product so that a user can see and hear the product in operation via a product webpage before making a purchasing decision. The product functioning videos supplement any static images of the target product and the textual product description to provide the user with additional context for each of the product's features, depending on the textual product description. The user can quickly and easily interact with the product webpage to access and playback the product functioning video to see and/or hear the product in operation.

20 Claims, 13 Drawing Sheets

(51) Int. Cl.
*G06Q 30/0601* (2023.01)
*G06F 16/783* (2019.01)

(52) U.S. Cl.
CPC ........... *G06F 16/7837* (2019.01); *G06N 3/08* (2013.01); *G06Q 30/0623* (2013.01); *G06V 20/41* (2022.01)

(58) Field of Classification Search
CPC ......... G06T 7/0002; G06T 2207/30168; G06T 7/11; G06T 7/97
See application file for complete search history.

(56) References Cited

U.S. PATENT DOCUMENTS

| | | | | |
|---|---|---|---|---|
| 10,635,952 | B2* | 4/2020 | Sewak | G06V 30/19173 |
| 10,769,444 | B2* | 9/2020 | Moore | G06V 10/82 |
| 10,810,357 | B1* | 10/2020 | Tsypliaev | G06F 3/0484 |
| 10,878,473 | B1* | 12/2020 | Thekkanal | G06Q 30/0641 |
| 11,398,089 | B1* | 7/2022 | Jindal | G06V 10/82 |
| 11,538,060 | B2* | 12/2022 | Kumar | G06F 16/3325 |
| 11,669,734 | B2* | 6/2023 | Lee | G06F 18/2413 |
| | | | | 382/156 |
| 11,720,622 | B2* | 8/2023 | Barkan | G06N 3/045 |
| | | | | 382/156 |
| 11,727,049 | B2* | 8/2023 | Kim | G06F 17/16 |
| | | | | 382/103 |
| 11,734,746 | B2* | 8/2023 | Guo | G06F 16/24578 |
| | | | | 382/157 |
| 11,741,191 | B1* | 8/2023 | Zilka | G06V 10/46 |
| | | | | 706/12 |
| 2012/0303636 | A1* | 11/2012 | Luo | G06F 16/986 |
| | | | | 707/790 |
| 2014/0089124 | A1* | 3/2014 | Jha | G06Q 30/0623 |
| | | | | 707/723 |
| 2014/0195337 | A1* | 7/2014 | Taylor | G06Q 30/0277 |
| | | | | 705/14.71 |
| 2018/0012107 | A1* | 1/2018 | Xu | G06F 18/2414 |
| 2018/0181569 | A1* | 6/2018 | Jarr | G06Q 30/0603 |
| 2018/0196879 | A1* | 7/2018 | Lev | G06F 16/24578 |
| 2019/0065856 | A1* | 2/2019 | Harris | G06F 18/2148 |
| 2019/0124403 | A1* | 4/2019 | Favicchio | H04N 21/431 |
| 2020/0026928 | A1* | 1/2020 | Rhodes | G06T 7/194 |
| 2020/0306640 | A1* | 10/2020 | Kolen | G06N 3/047 |
| 2020/0327709 | A1* | 10/2020 | Liu | G06V 10/82 |
| 2021/0004605 | A1* | 1/2021 | Hsiao | G06F 16/7844 |
| 2021/0042579 | A1* | 2/2021 | Chen | G06N 3/08 |
| 2021/0127943 | A1* | 5/2021 | Ha | A47L 15/427 |
| 2021/0173722 | A1* | 6/2021 | Weiner | G06F 18/24 |
| 2021/0195286 | A1* | 6/2021 | Lohumi | G06F 18/2451 |
| 2022/0059132 | A1* | 2/2022 | Sun | G11B 27/28 |
| 2022/0101407 | A1* | 3/2022 | Xu | G06Q 30/0631 |
| 2022/0188549 | A1* | 6/2022 | Mishra | G06F 40/35 |
| 2022/0207284 | A1* | 6/2022 | Duvvuri | G06N 7/01 |
| 2022/0237417 | A1* | 7/2022 | Singhal | G06V 10/809 |
| 2022/0358571 | A1* | 11/2022 | Gabale | G06Q 20/20 |
| 2023/0082407 | A1* | 3/2023 | Byun | H04N 23/661 |
| | | | | 386/223 |
| 2023/0230400 | A1* | 7/2023 | Liu | G06V 10/464 |
| | | | | 382/190 |

OTHER PUBLICATIONS

Tous R. et al., "User-generated Content Curation with Deep Convolutional Neural Networks", 2016 IEEE International Conference on Big Data (Big Data), Washington, DC, USA, 2016, pp. 2535-2540.

Bahtar A.Z. et al., "The Impact of User—Generated Content (UGC) on Product Reviews towards Online Purchasing—A Conceptual Framework", Procedia Economics and Finance, 2016, vol. 37, pp. 337-342.

Bird S. et al., "Natural Language Processing with Python", Jun. 2009, O'Reilly Media, Inc., Safari Books Online, 504 pages.

Rachna M. et al., "A Study of User-Generated Content on Social Networking Sites and its Impact on Consumer-Based Brand Equity Constructs", 2017, Global Journal of Management and Business Research (E), vol. 17, 9 pages.

\* cited by examiner

INTEGRATING VIDEO CONTENT INTO ONLINE PRODUCT LISTINGS TO DEMONSTRATE PRODUCT FEATURES

FIELD OF THE DISCLOSURE

This disclosure relates generally to the field of image processing, and more particularly, to techniques for integrating video content into online product listings to demonstrate product features.

BACKGROUND

Online shopping represents a significant and increasing portion of world economic activity. Product photographs are often considered an essential component of a successful e-commerce operation. This is partly because a strong visual presentation of a product attracts and sustains buyer attention, but also because online shoppers cannot touch, examine, or try the product that they are considering for purchase, and they must therefore rely on the various photos that depict the product. Seeing a product functioning in real life can also help buyers make purchasing decisions. In an online e-commerce environment, videos are one way to demonstrate product features while the product is in operation. However, many sellers, particularly small-scale sellers, do not provide videos that showcase the functionality of their products, in part due to lack of experience and/or the expense of producing such videos.

Various types of online selling platforms are available to facilitate the sale of online products, by offering support services such as product search tools, product review section that includes feedback of previous purchasers of a given product, and secure selling protocols. However, such platforms lack the ability to provide useful guidance to the buyer about relevant product details that would increase the probability of a successful sale, particularly with respect to visual product details. In particular, while users of online selling platforms are often presented with static images of a given product of interest, such images don't allow the user to more fully experience the product in a real-life like manner. For instance: if a user is buying a couch online, that user might like to see how soft the cushions are (e.g., how far do the cushions depress when pushed upon); likewise, if a user is buying a decorative light online, that user might like to see how the light twinkles over a short period of time; and as one more example case, if a user is buying an alarm clock online, that user might like to hear how the alarm clock sounds. Static images simply do not meaningfully convey such product information. To this end, presenting the user with product videos demonstrating the functioning of the product would be useful, for example how far does a couch cushion depress when pushed upon, or how a light twinkles over a short period of time, or how an alarm clock sounds.

However, currently there is no mechanism available that locates product videos that demonstrate the features of the product and makes the videos accessible to the user within the context of an online product shopping session. This inability stems from a technological shortcoming of current online product selling platforms. In particular, current online selling platforms lack the intelligence to extract information describing a product from a given source, such as a webpage and/or a user query, and to identify and provide access videos, or portions of videos, that are relevant to that product information, particularly when the information includes a variety of different features describing the product, such as the modes of operation and other functions provided by the product. These shortcomings preclude the determination and delivery of useful guidance to an online buyer about relevant visual and audible product details that might increase the probability of a successful sale, or otherwise be useful to the buyer. To this end, complex and non-trivial issues associated with online selling platforms remain.

SUMMARY

Techniques are provided herein for identifying video content that demonstrates features of a target product and integrating access to that video content into an online product listing. Although the techniques are useful in a number of applications, they are particularly useful in the context of an online selling platform with respect to using videos to create a more compelling product listing and assisting a prospective buyer of a product to more fully experience the features of that product during the buyer's purchasing decision process. In such cases, the online product listing and associated video content can be included, for example, on a product webpage servable by the online selling platform to a prospective buyer that has searched for the product and clicked on or otherwise requested the product webpage. The techniques can be executed in an offline manner, independently of a given product listing being made available to prospective buyers via the online selling platform. For example, the techniques operate during or after creation of a listing for the product to be sold on the online selling platform (e.g., Amazon®, eBay®, Magento® based e-commerce platforms, etc.). For instance, video uploads by users to the online selling platform, such as videos uploaded in conjunction with product reviews, can trigger the techniques disclosed herein to identify which product is seen in the video and one or more of that product's features that are demonstrated in the video. An example of such a video is one made by a user with her smartphone recording the sound of an alarm clock she recently purchased, or a video recording the moving action of a child's toy she just received from an online seller (these videos are sometimes referred to as "unboxing videos" but could include any type of user-generated video that shows the product). Any of these videos, or portions of the videos, that demonstrate relevant product features are then presented or otherwise made accessible via a product webpage so that shoppers browsing the product webpage can play back the videos to see and hear the product in operation, and in particular, specific features of the product. Such product functioning videos are useful for helping shoppers make better informed purchasing decisions than they would otherwise be able to make without seeing or hearing the product's features.

In more detail, once the initial listing for the product webpage is created, which may include, for instance, a textual description of the product and one or more images, the disclosed techniques can begin searching for videos that are relevant to the product after the initial listing is completed, or in response to the listing being updated or new videos being uploaded. In any such cases, and according to an example, text corresponding to a given product description of the online product listing is parsed to extract words and/or phrases that describe the target product itself as well as one or more features of the target product, such as motion features, audio features, or appearance features. So, for instance, and continuing with the alarm clock example, the extracted textual content might include the brand name and generic product name (e.g., Panasonic alarm clock) as well as motion features (e.g., analog readout with minute hand), audio features (e.g., sound of alarm clock), or appearance features (e.g., nighttime display). The extracted words are then used in conjunction with one or more computer vision techniques to identify videos demonstrating the product, and more particularly, these features of the product. As noted above, the videos may be, for instance, user-generated videos of the product stored in a database of the online selling platform. In a more general sense, the videos may be stored in any number of databases accessible to the online selling platform, whether internal to the platform (e.g., database of user-generated content) or external to the platform (e.g., public video database such as YouTube®).

Once a video associated with the target product is identified, it is further analyzed to identify which product features are present in the video, and in which portions of the video those features appear. In more detail, and according to some embodiments, one or more user-generated videos are segmented into smaller video segments (snippets), and keyframes from each video segment are processed to identify whether, and where, the target product appears in the video and which, if any, product features are demonstrated by the video. In some examples, the segments are of equal length (e.g., five seconds long each), excepting any remainder of the video that is less than the length of the other segments (e.g., if each segment is five seconds long, then a 12 second long video will have two five-second long segments and one two-second long segment). The segments that demonstrate the product features are labeled according to the type of feature (e.g., motion, audio, or appearance) Labeled video segments that correspond to the features of the target product are then displayed or otherwise made available to the user via the product webpage or other product listing. In this manner, product webpage provides the shopper with a robust presentation of the target product in effort to increase sales, and a prospective buyer can see and/or hear or otherwise more fully experience the product in operation before making a purchasing decision.

In some examples, one or more text and image processing techniques are employed to carry out the video identification and presentation. For example, a natural language processor and part-of-speech tagger can be used to extract descriptive words from the product description and remove extraneous, non-descriptive words such as pronouns and conjunctions. In addition, one or more neural networks can be used to identify a product in a video and to determine which features of the product are present in the video. In addition, sound localization techniques can be used to determine whether audio in a video spatially corresponds to the product, for identifying audio features of the product, and machine learning techniques can be used to determine whether visual appearance features of the product are visible in the video. Portions of the product description on the product webpage can be hyperlinked and thus used to activate, via a user input such as a mouse click or mouse-over (hover), one or more product functioning videos that demonstrate the features corresponding to the product description. For example, clicking on or hovering over a hyperlinked textual description of the alarm sound of an alarm clock product can cause a video demonstrating the alarm sound to be presented within the product webpage. Similarly, clicking on or hovering over a hyperlinked textual description of the spinning feature of a toy can cause a product video demonstrating the toy spinning to be presented within the product webpage. Other examples will be apparent in view of this disclosure.

Note that the videos being presented need not be copied or modified. Rather, in some embodiments, clicking on or hovering over a hyperlink causes the original version of the video, or a portion thereof, to play in the user's browser, such as in a pop-up window or in a portion of the product webpage. Further note that rights associated with videos stored in a given online database can vary from one system to another, and any restrictions stemming from such rights can be used to exclude certain videos from use. To this end, note that copies of video files (e.g., .MP4, .MOV, .WMV, .AVI, or some other video file format) identified during the video search need not be made; rather, in some examples, the techniques operate to provide access to the source of the video content, rather than a copy of that video content, such that the source file that includes the identified video content is played back from its current storage location but presented in the prospective buyer's browser or other user interface. In other examples, a copy of the identified video source file(s), or the relevant snippet of the video source file(s), may be made and ported into a database or repository local or otherwise accessible to the online selling platform, and thus can be played back from that new storage location. Many online selling platforms that allow users to post user-generated content (UGC) content (e.g., product feedback, images, videos, etc.) effectively limit user rights in any such uploaded UGC content, per the platform's terms and conditions agreed to by users; in such cases, the UGC content can be freely used, copied, modified, or distributed within that platform with little or no restriction. Note that more than one video, more than one segment of a video, or segments of multiple videos can be played individually or in sequence (e.g., a temporal sequence to maintain continuity between videos/segments) so that the video(s) and segments of the video(s) that are most relevant to demonstrating the product features are presented, while other video(s) or portions of the video(s) are suppressed from being presented to the user.

DETAILED DESCRIPTION

Figure 1:
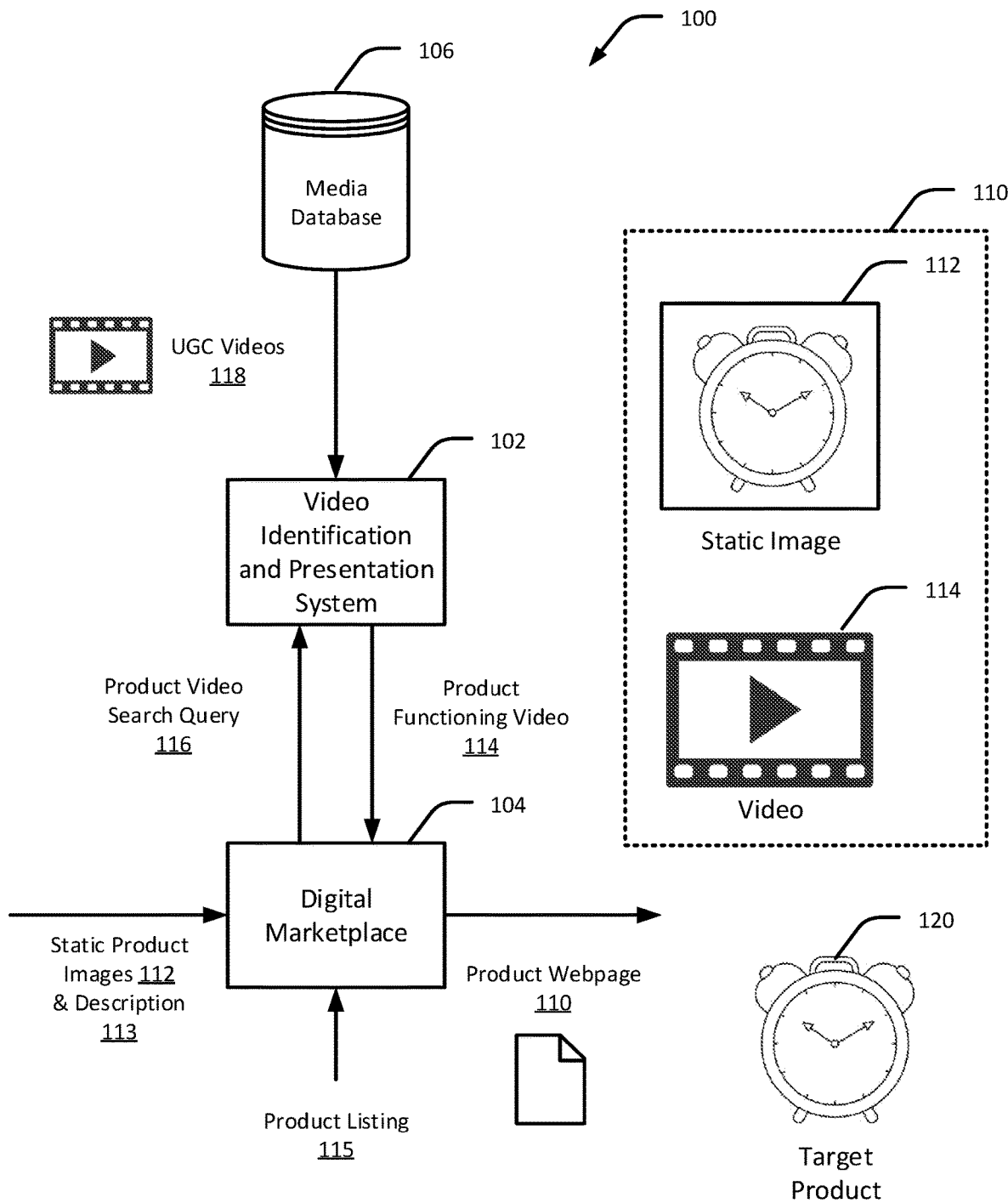
FIG. 1 is a block diagram of an online product selling system including a video identification and presentation system, a digital marketplace, and a media database, in accordance with an embodiment of the present disclosure.

Techniques are provided herein for integrating video content that demonstrates product features into online product listings. Although a number of applications will be appreciated, the techniques are particularly well-suited in the context of online shopping, where they can be used by an e-commerce platform to provide a prospective buyer (a shopper) interested in a product with one or more videos that demonstrate specific features or functions of the product in operation, including motion, light, and sound. While existing product webpages typically include a textual description of a product for sale, possibly along with one or more static images of the product, it is less frequent that the seller also provides a video that demonstrates the features of the product, such as motion, audio, or appearance. Such videos can help shoppers get a better sense of how the product operates and sounds than they can from just the description or static images. In cases where there is no seller-provided video, there may be videos uploaded by people who have purchased the product and recorded the product in operation (sometimes referred to as "unboxing videos," which are popular in social media). Such videos may show one or more functions of the product, such as the movement of a child's toy or the sound of an alarm clock. However, these user-generated videos are not organized in a way that makes it easy for a potential buyer of the product to find or access them, such as directly through the product webpage on the seller's web site.

To this end, techniques are provided for analyzing user-generated videos to identify whether they contain the product that is associated with an online product listing, and if so, whether the videos demonstrate one or more features as described in the product listing. These techniques include using a combination of text processing routines, neural networks, and computer vision tasks to determine whether a given video demonstrates any of the described features of the product and, if so, to make that video directly accessible to the shopper via the product webpage (such as by creating a hyperlink between the textual product listing and the video). In cases where multiple videos are available, the techniques further evaluate the aesthetic quality of the videos using a trained neural network to choose the best quality video for presentation.

An online selling platform utilizing the disclosed techniques provides the prospective buyer with a relatively good sense of how a particular product works in real life, a sense that is lacking from the current online shopping experience with static images only. For example, some existing websites allow prospective buyers to view static images of a product from different angles or in different states of operation, but the prospective buyer has no ability to see or hear the product in actual operation. While some existing websites provide a place for product feedback, which can include product videos that are uploaded by previous buyers of the given product and can be viewed by prospective buyers of the given product, there are currently no mechanisms for locating and playing those videos within the context of an online shopping session (such as directly from the product webpage), nor are there any mechanisms to identify a portion or snippet of a given video that shows a specific feature of interest (e.g., alarm clock sound). Exacerbating this issue is that there can be many different videos demonstrating various features of the product, but there is no easy way to surface those to the prospective buyer, particularly to provide access to videos that highlight specific product features that the prospective buyer is interested in and wishes to view or hear in operation.

To this end, the techniques provided herein can be used in conjunction with existing videos, including user-generated content (UGC) of previous buyers, to provide a system that is programmed or otherwise configured to identify video content that corresponds not only to a target product being viewed by a user, but also to identify (using, for example, computer vision techniques) one or more specific features of the target product that appear in the video, and to provide the user ready-access to that video content (e.g., via a browser or other user interface). In some such embodiments, the existing videos include UGC that is not curated or otherwise organized or labeled for easy identification and access but is nevertheless accessible to the system for processing as provided herein.

At a high level, the techniques can be embodied in a system programmed or otherwise configured for identifying, and providing access to, videos relating to one or more features of a target product. The disclosed techniques can be used, for instance, at any time after a product listing (e.g., a product webpage that lists the product for sale, or an online advertisement that lists features of the product, or other such online informative product listing) describing the product is authored or updated or otherwise made available to the system for processing, such as in an offline or background processing environment. In some such example embodiments, the techniques are integrated within the creation or presentation process of online product listings, so as to allow sellers to provide more helpful or otherwise impactful listings. In some other example embodiments, the techniques are used after the product listing has been created, such as in response to a user uploading new video content that shows the product. In this manner, the relevant video content can be identified and integrated into the online product listing at any time and thus made available to prospective buyers at the time the online product listing (e.g., the product for-sale webpage or product advertisement, etc.) is rendered in a browser or other user interface, such as in response to a user product search that returns a given product or when an advertisement for the given product is served to a user. Furthermore, when more than one video is a candidate for inclusion with the product listing, the disclosed techniques can evaluate each candidate video for aesthetic quality and select the video having the highest quality for presentation with the product listing. In this manner, a newly added video showing a given product feature can replace or displace an older video of that same feature if the newer video has a higher aesthetic quality.

In one example embodiment, the system extracts text from an initially created product webpage that describes the features of the target product. The product webpage may include, for instance, an advertisement of the target product or a for-sale listing of the product. Once the product webpage is updated to provide access to product video content as provided herein, the product webpage can be served to a user by an online selling platform in response to a user query for that product. Various text processing techniques can be utilized during the text extraction, including natural language processing and part-of-speech tagging, to extract words that are descriptive while discarding non-descriptive words that are not specifically related to the product (including words such as "the" and "and"). The system further identifies (using the extracted descriptive words) and ingests one or more UGC videos, segments the videos accessible to the system (e.g., via one or more video databases that are internal and/or external to the system) into snippets, and uses machine learning models to identify the target product in the videos and any features, such as motion, audio, and appearance, that are demonstrated in the snippets. The snippets or other portions (such as temporally adjacent snippets) of the UGC videos that include demonstrations of the features of the target product are then presented on the product webpage, for example, through hyperlinks embedded in the product description text of the webpage. When the product webpage is displayed or presented to a user via a browser, a user can activate the corresponding product functioning videos for playback from within the product webpage by clicking on or mousing over (also referred to as hovering over) these links.

In more detail, and according to an embodiment, the techniques can be implemented in the context of an online selling platform (e.g., Amazon®, eBay®, Magento® based e-commerce platforms, or any seller having a website that allows for online selling of products, such as Apple®, Lowes®, Walmart®, etc.). In such a case, a product webpage is modified to include product functioning videos and embedded links or other interactive controls for playing the videos within a browser when a user navigates to the product webpage for a target product, i.e., the product that the user is considering purchasing. In addition to any static images and the textual product description provided by the seller on the product webpage, one or more product functioning videos are presented on the webpage. The product functioning videos can, for instance, be associated with a media database of the digital marketplace (e.g., Amazon®, eBay®, Magento® based e-commerce platforms, etc.) that sells the target product and/or an external database (e.g., YouTube®) that is searchable using the extracted descriptive words. In this manner, the videos are more likely (although not guaranteed) to demonstrate the features of the target product being offered for sale by the seller, such as motion features, audio features, and appearance features. The identified videos can then be further analyzed. In some embodiments, for instance, machine learning is used to classify the videos by product, product feature, and aesthetic quality, so that only videos relevant to the features of the product are presented on the webpage, while videos that are not relevant or not of high quality are not presented to the user. In some embodiments, the videos are located, analyzed, modified (e.g., reduced to one or more relevant snippets or portions), and integrated into the product webpage in an offline or background processing environment such that videos relevant to the product are available when the product webpage is served to the user's browser. Numerous embodiments will be appreciated in light of this disclosure.

Term Definitions

The term "target product" refers to a product offered for sale in an online selling platform. Examples of target products are "couch" and "alarm clock" and "spinning top toy."

The term "product feature" refers to a function of a target product, such as a motion function, an audio/sound function, or an appearance/lighting function. Product features can be static, such as a fixed position or color of the product, or dynamic, such as changes in position, configuration, sound, color, lighting, etc. that occur while the product is in operation.

The term "video" refers to an animated sequence of images that include visual and/or audio demonstrations or depictions of a target product. A "candidate video" is a video that has been selected for potential presentation via the product webpage. A "product functioning video" is a candidate video that has been selected for presentation via the product webpage.

The term "product webpage" refers to a webpage including product description text (for example, text written in any natural language) that describes features, functions, and other characteristics of the target product. The product webpage can include computer-executable code (for example, code written in hypertext markup language (HTML) or extensible markup language (XML) code) for rendering the content of webpage, including the product description, within a web browser. The product webpage can further include code (for example, code written in hypertext markup language (HTML) or extensible markup language (XML) code) for rendering static images or videos within the browser or via another suitable application, such as a user interface of an online product selling system.

An online product listing refers to a description of a product being offered for sale online. The description may include text and/or one or more static product images that describe(s) features, functions, and other characteristics of the target product. A product webpage that is servable to a prospective buyer via an online product selling system and is descriptive of a given product is an example of an online product listing.

The term "digital marketplace" as used herein refers to an online (e.g., website-based) market that facilitates buying and selling of products. Amazon® is one example of a digital marketplace. eBay® is another example of a digital marketplace. Magento® based e-commerce platforms are also examples of digital marketplaces.

General Overview

As noted previously, online selling platforms lack the ability to provide videos that demonstrate various features of products, particularly with respect to features that involve motion, audio, or changing appearance. For example, a prospective buyer who may wish to purchase an alarm clock would like to hear the alarm sounds before deciding to purchase the clock. With static images or textual description alone, the prospective buyer cannot hear the alarm sound. Sellers may not, by default, provide the prospective buyer with the ability to hear the alarm sound from within the product webpage (or other online product listing), and thus the prospective buyer may either decide not to purchase the clock because of unanswered questions about how it functions, or the user may purchase the clock and then become dissatisfied with it after receiving it and hearing the alarm sound. To this end, techniques are provided herein for identifying video content from, for example, a media database of UGC videos that demonstrate one or more features of the target product so that, when the product webpage is presented, a user can see and hear the product in operation before making a purchasing decision. The product functioning videos supplement any static images of the target product and the textual product description on the product webpage to provide the user with additional context for each of the product's features, depending on the textual product description. The user can quickly and easily interact with the product webpage to access and playback the product functioning video to see and/or hear the product in operation.

As will be appreciated in light of this disclosure, providing a user with the ability to view videos of products demonstrating their functionality can be accomplished by a system that is able to leverage content accessible from a variety of different sources, including unstructured user-generated content. Thus, and in accordance with some embodiments, the techniques discussed herein use neural networks to analyze videos uploaded by previous purchasers of a given product or product marketing personnel. Specifically, the neural networks are trained to identify the target product in each of the uploaded videos so that the videos can be labeled and organized based on the product's features, as described on the product webpage. The videos can also undergo some video processing operations to enhance the usefulness of the video, such as by locating portions of the videos that are relevant to the respective product features and excluding or editing out videos or portions of videos that are not useful for demonstrating the product's operation. The neural networks also provide adaptability in the form of unsupervised learning to identify additional products as they are added to the marketplace and identify additional product features as product descriptions are added.

Numerous examples are described herein, and many others will be appreciated in light of this disclosure. For example, although many of the examples herein refer to using the disclosed techniques to help a user visualize or hear the operation of a target product, the same techniques can be equally applied to other objects, such as product accessories or complementary products that may be purchased and/or used in conjunction with the target product.

Example Processing Environment

FIG. 1 is a block diagram of an online product selling system 100 including a video identification and presentation system 102, a digital marketplace 104, and a media database 106, in accordance with an embodiment of the present disclosure. The product selling system 100 is configured to enable a user to shop for a target product 120 in the digital marketplace 104. As part of the shopping experience, the digital marketplace 104 provides a product webpage 110 containing information about the product, including one or more static images of the product 112 and a product description 113, and/or access to one or more videos of the product 114 that demonstrate the function or operation of the product. The product functioning video 114 is intended to show the user how the product operates in real-life, including motion, sound, and appearance, so that the user can evaluate the product's functions more completely before purchasing it. The product selling system 100 may be hosted on any suitable computing system such as one or more servers. In a server-client configuration, some functionality of the product selling system 100 may be carried out on a server computer and other functionality of the product selling system 100 may be carried out on a client device, such as a smart phone, tablet, mobile device, etc. For instance, a user interface of the digital marketplace 104 that allows for presentation of the product webpage 110 to the user may execute on the user's device, and functionality with respect to product video search can be carried out on the server side.

In any case, the product selling system 100 is configured to provide, via the product webpage 110, user access to the static product images 112, the product description 113, and the product functioning video 114. The static product images 112 and product description 113 can be obtained, for example, from a seller of the product who creates a listing 115 for the product webpage. The product description 113 can include text written in any natural language, such as English. The product functioning video 114 can be obtained from the media database 106, which is configured to store a variety of user-generated content (UGC). To obtain the product functioning video 114, the digital marketplace 104 sends a product video search query 116 to the video identification and presentation system 102. The query 116 can be sent to the video identification and presentation system 102 at any time, for example, any time after the listing 115 is created or otherwise posted to the digital marketplace 104. The query 116 includes information about the product 120, such as product features, which are extracted from the textual product description 113. The video identification and presentation system 102 analyzes the product information to classify product features, including motion features, audio/sound features, and/or appearance features of the product 120. For example, if the product information describes "realistic movement," then the product is classified as having one or more motion features. In another example, if the product information describes "sound," then the product is classified as having one or more audio features. In yet another example, if the product information describes "bright light," then the product is classified as having one or more appearance features. Note that the product 120 can have any number of features based on the product description 113, as will be appreciated.

Next, the video identification and presentation system 102 obtains one or more UGC videos 118 from the media database 106. The UGC videos 118 can include, for example, user-generated videos demonstrating or otherwise showing various features of the product 120 (such as "unboxing videos" or other video content uploaded by various users). Next, the video identification and presentation system 102 processes the UGC videos 118 to extract one or more video segments, or snippets, that are relevant to the classified feature(s) of the product 120, such as portions of the video showing the product in motion or in operation, portions of the video with sounds generated by the product while in operation, or any other portions of the video demonstrating or showing the product. Note that the video segments include selected portions of the UGC videos 118 that are relevant to demonstrating the product feature(s), while other portions of the videos, such as portions not displaying or otherwise demonstrating the product feature(s), can be discarded or otherwise unused. The video identification and presentation system 102 designates the video segment(s) as the product functioning video 114, which is provided to the digital marketplace 104 for inclusion on the product webpage 110.

The product webpage 110 includes product description text 113 that describes features, functions, and other characteristics of the product 102. The product webpage 110 further includes computer-executable code (for example, code written in hypertext markup language (HTML) or extensible markup language (XML) code) for rendering the content of webpage, including the product description 113, within a browser. The product webpage 110 further includes code (for example, code written in hypertext markup language (HTML) or extensible markup language (XML) code) for rendering the static product image 112 and/or the product functioning video 114 within the browser 112 or via another suitable application, such as an image viewing application or a media player application. The static product image 112 can show the product 102 in various poses, such as observed from different camera angles, and in different configurations or states of operation, such as when the product is operational (turned on and active) and when the product is non-operational (turned off and inactive). The product functioning video 114 can show the product 120 in various poses, such as when the product is observed from different camera angles, and in different configurations or states of operation, such as when the product is operational (turned on and active) and when the product is non-operational (turned off and inactive). Unlike the static product image 112, the product functioning video 114 can show motion of the product 120 and/or provide audio generated by the product 120. In this manner, the product 120 can be demonstrated to the user in a dynamic, realistic fashion so that the user can view and hear the product in operation and use.

Example Use Scenario

Figure 2A:
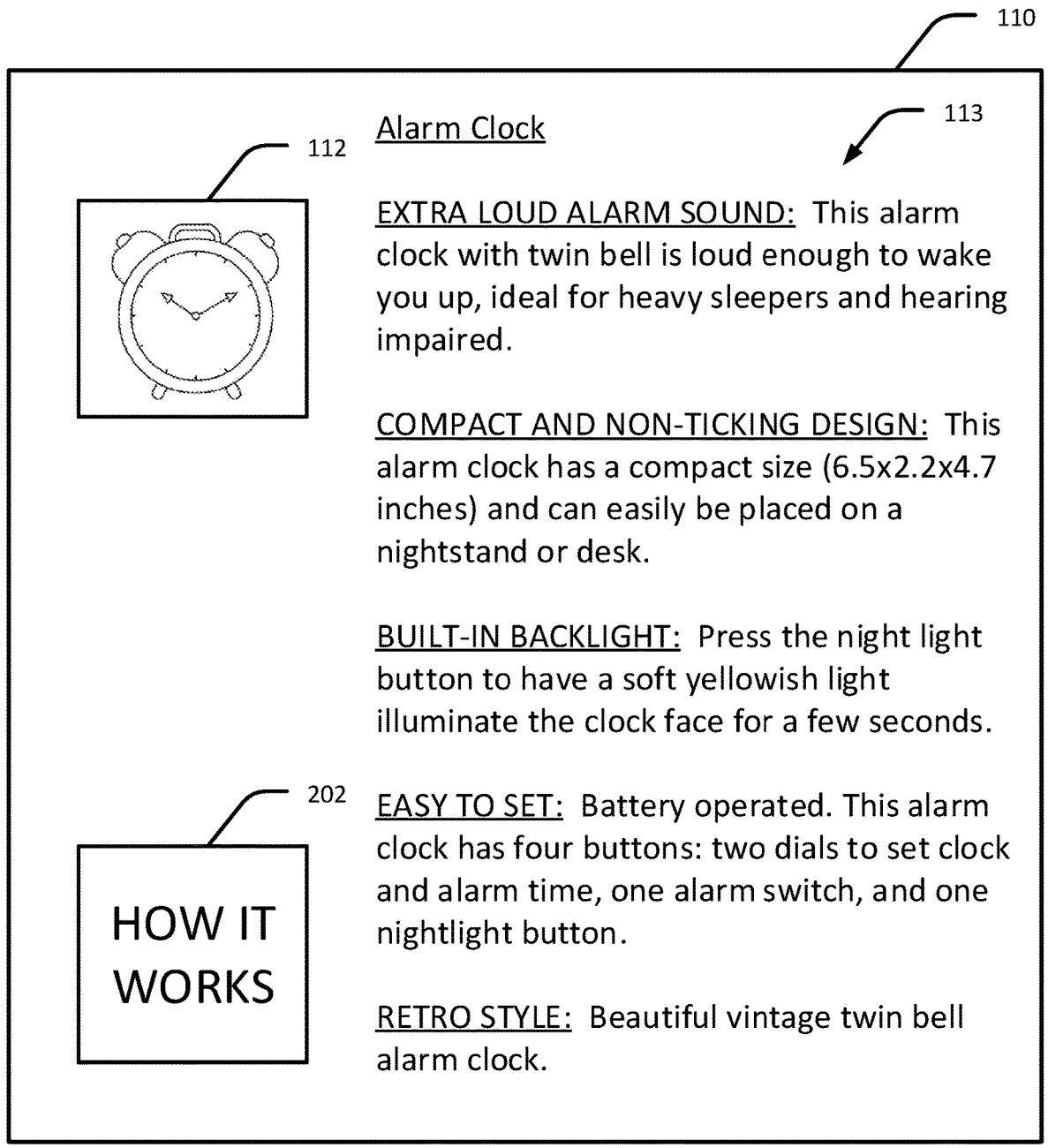
FIGS. 2A-F show several examples of product webpages for a target product provided by the online product selling system of FIG. 1, in accordance with an embodiment of the present disclosure.
Figure 2B:
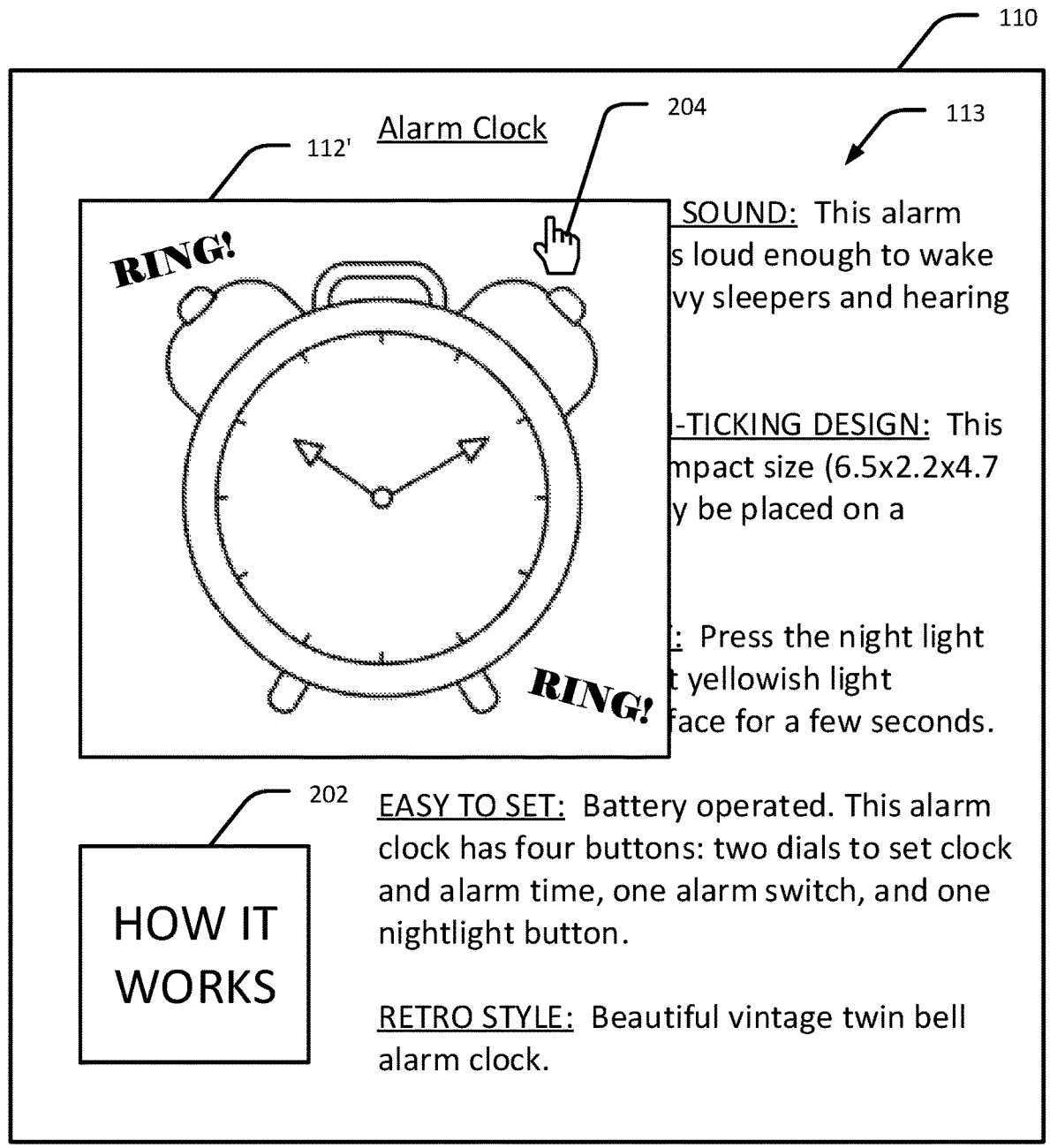
Figure 2C:
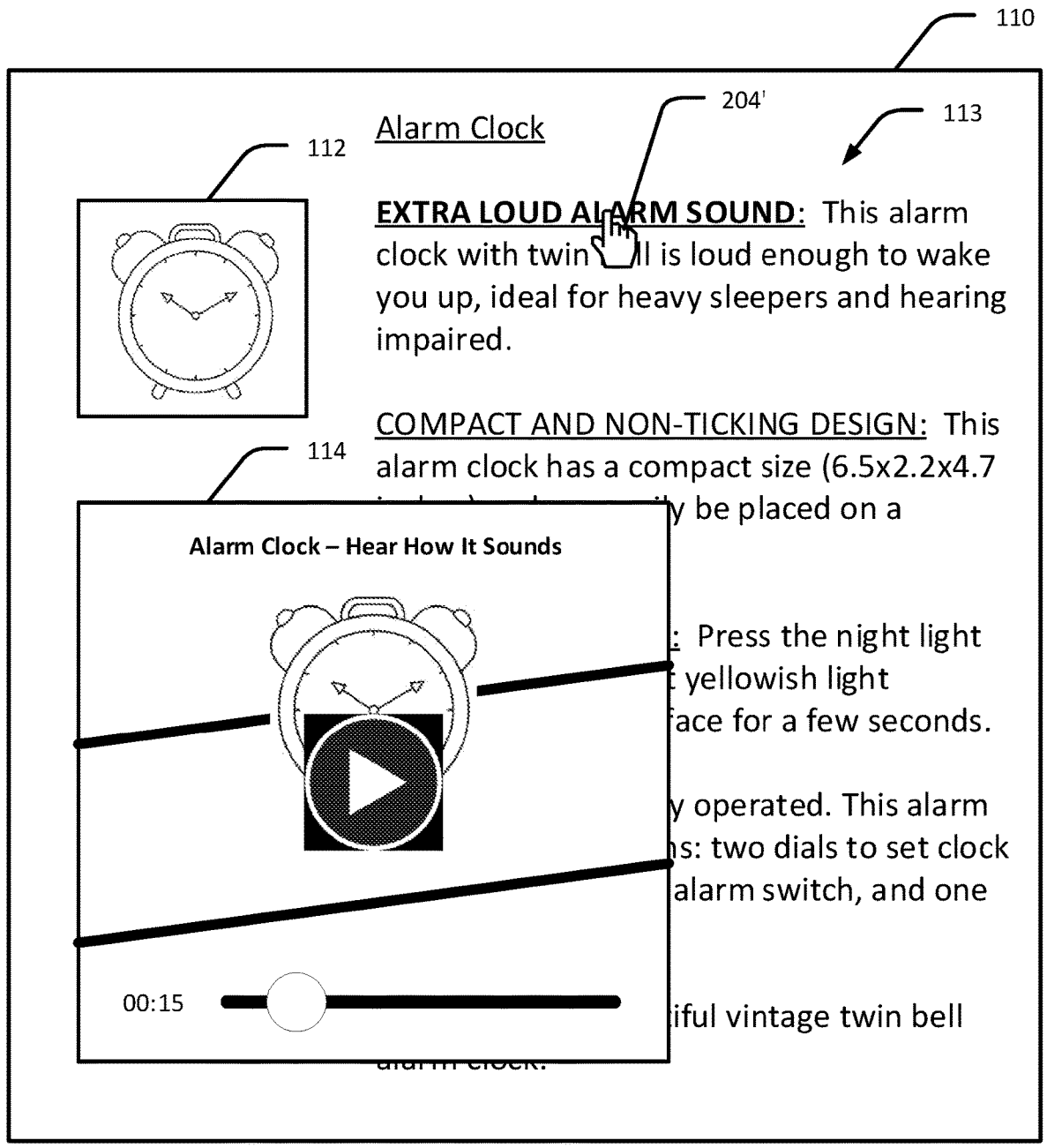
Figure 2D:
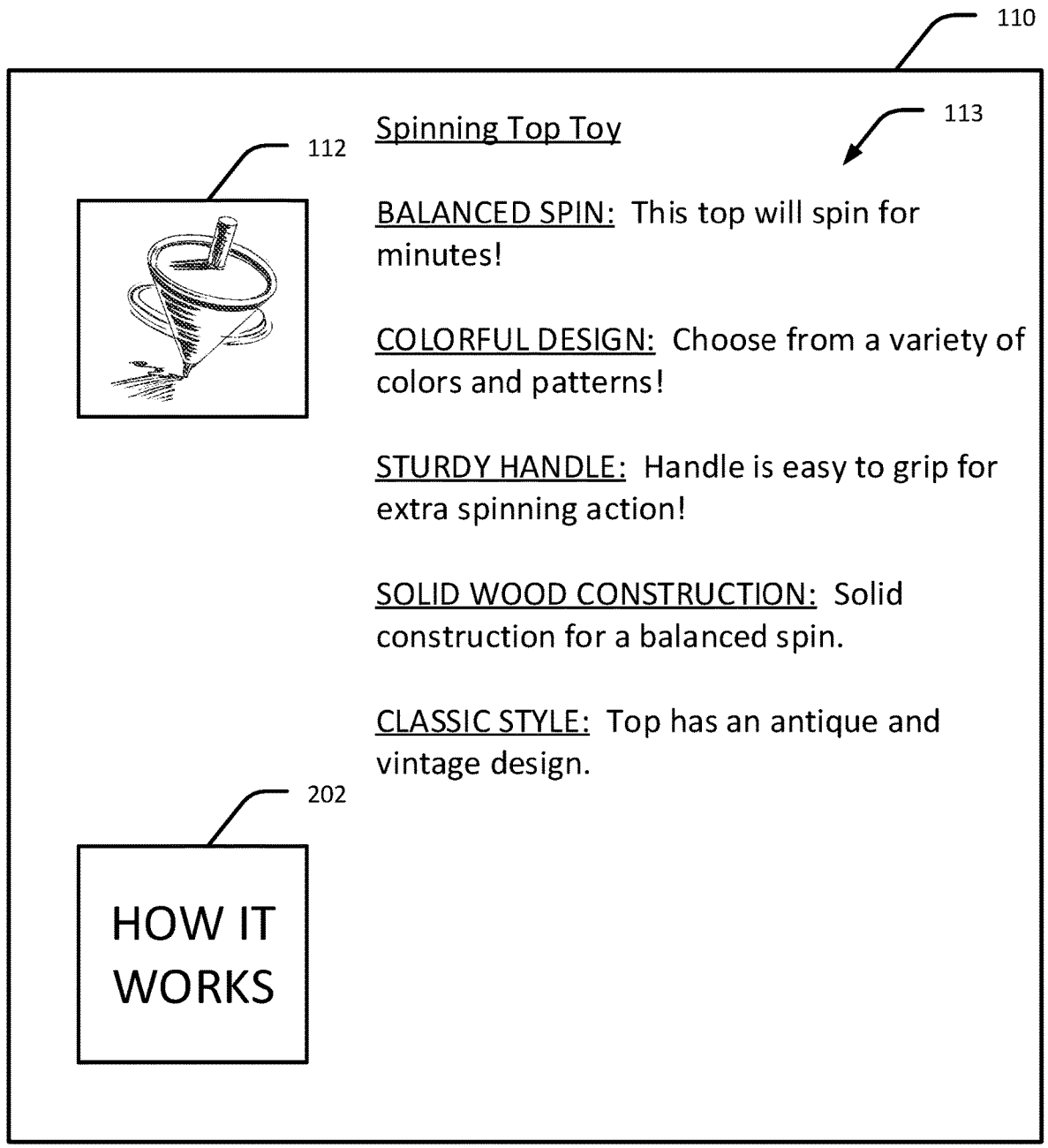

FIGS. 2A-F show several examples of the product webpages 110 of FIG. 1 rendered in a web browser, in accordance with an embodiment of the present disclosure. As noted above, the product webpage 110 can be generated offline, for instance, responsive to the digital marketplace 104 receiving the product listing 115 from the seller. It will be understood that the views and specific details of the product webpage 110 can vary from one embodiment to another, depending on the target product 120 and the content of the corresponding product webpage 110, including the static images 112 of the product, the product description 113, and the product functioning videos 114. Other examples of laying out similar components with the same functionality would be readily apparent in light of this disclosure. In FIGS. 2A-C, the example target product 120 is an alarm clock, and in FIGS. 2D-F, the example target product 120 is a spinning top toy. In FIGS. 2A and 2D, the product webpage 110 includes the product description text 113, the static image 112, and an interactive element 202. In this example, the interactive element 202 is labeled "HOW IT WORKS," although it will be understood that a different label, image, or icon can be used to indicate the interactive element 202. The product webpage 110 is configured such that the static image 112 and the interactive element 202 are responsive to a user input, such as a mouse click, mouse-over, or other input or browser event that selects the static image 112 or the interactive element 202, respectively. For example, either or both of the static image 112 and the interactive element 202 can be activated by the user input, such as shown and described with respect to FIGS. 2B, 2C, 2E and 2F.

Figure 2E:
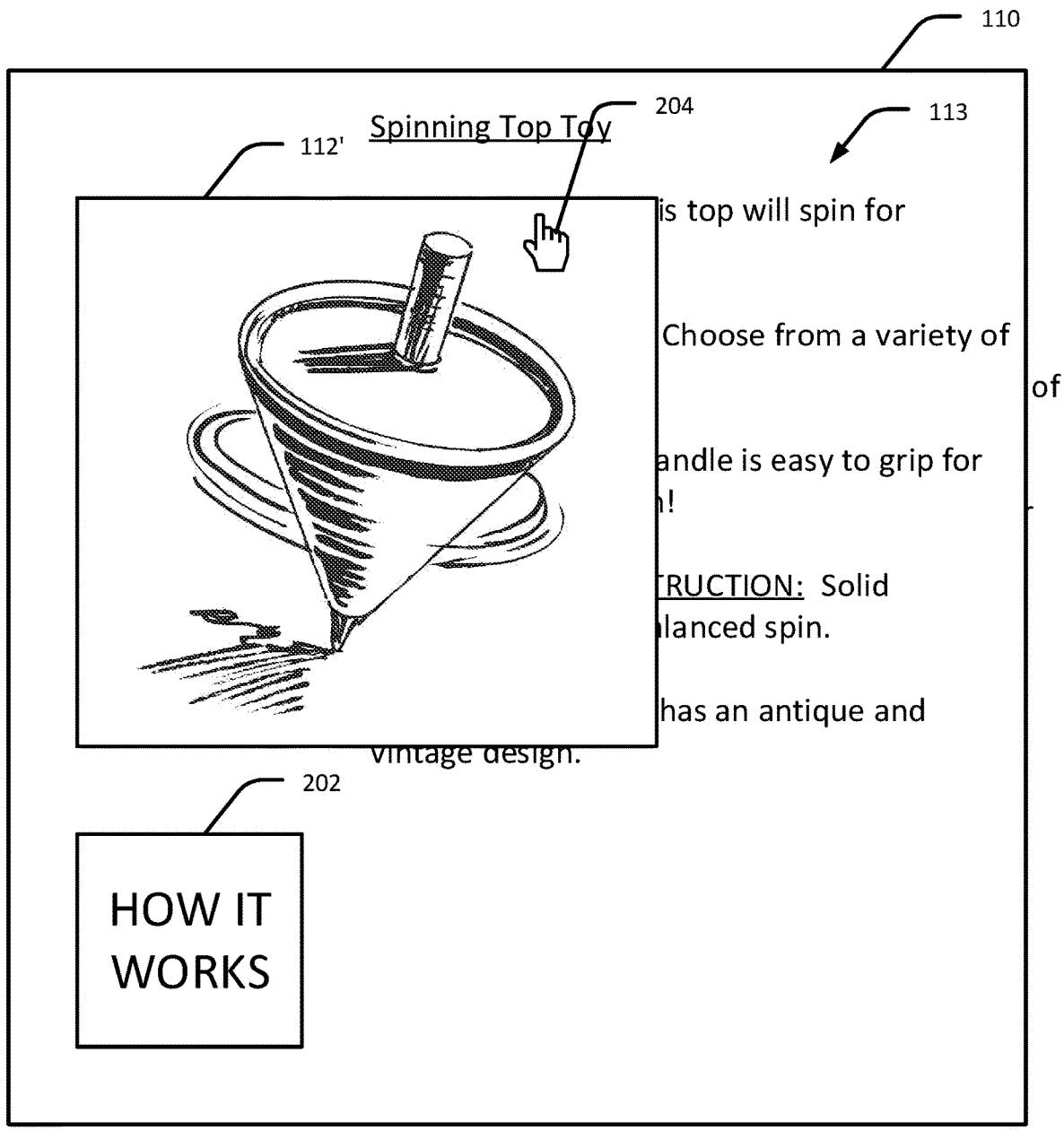

In FIGS. 2B and 2E, the user input 204 is a mouse click, a mouse-over, or other input on or to the static image 112 of FIGS. 2A and 2D. In response to the user input 204, an enlarged version of the static image 112' is displayed within the product webpage 110. The enlarged image 112' provides the user with a magnified view of the static image 112. The enlarged image 112' can be dismissed or otherwise removed from the webpage 110, for example, in response to a subsequent user input, such as a mouse click outside of the region of the enlarged image 112' or a mouse-over event occurring outside of the region of the enlarged image 112'. It will be understood that the webpage 110 can include more than one static image 112 of the product 120, such as various images of the product from different camera angles or showing the product in different configurations, colors, styles, etc. In such cases, each of the static images can be magnified as described above with respect to the static image 112.

Figure 2F:
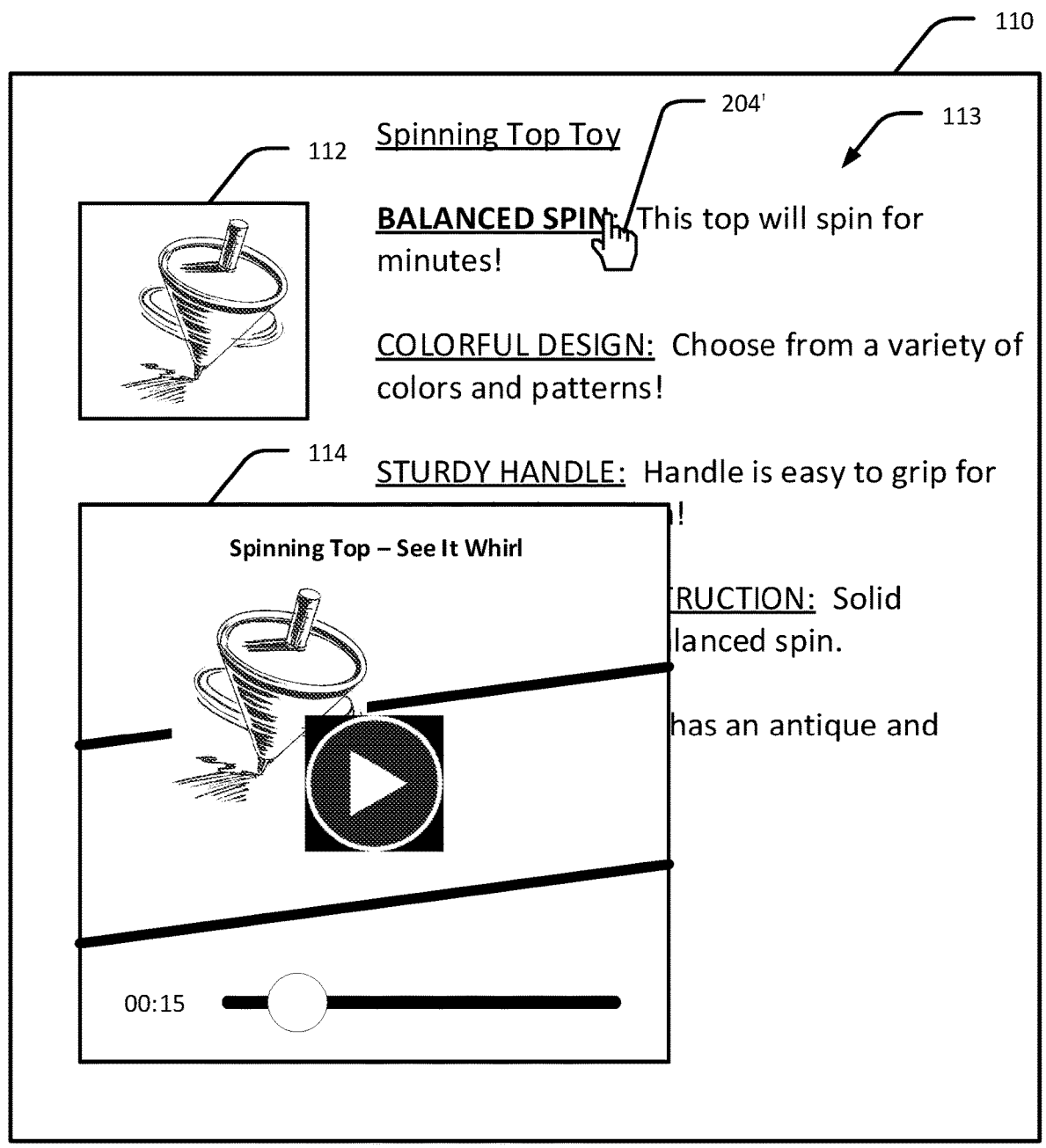

In FIGS. 2C and 2F, the user input 204 is a mouse click, mouse-over, or other input on or to the interactive element 204 of FIGS. 2A and 2D. In response to the user input 204, the product functioning video 114 is displayed within the product webpage 110. The user input 204' selects a portion of the product description 113 corresponding to a feature of the product 120, such as a motion feature, an audio feature, or an appearance feature. In some embodiments, the text within the product description 113 is highlighted with a hyperlink, bolded and/or underlined text, a contrasting font color, size, or style, or other visual indication so that the user knows to select the text to cause the product functioning video 114 to be displayed. The product functioning video 114 provides the user with an interactive interface for playing the video, including, for example, a play button and/or a slider control for controlling playback of the video. The product functioning video 114 can be dismissed or otherwise removed from the webpage 110, for example, in response to a subsequent user input, such as a mouse click outside of the region of the product functioning video 114 or a mouse-over event occurring outside of the region of the product functioning video 114.

It will be understood that the webpage 110 can include more than one product functioning video 114 of the product 120, such as various videos demonstrating or otherwise displaying different features or operations of the product. For example, one such video may provide a demonstration of product motion features, another such video may provide a demonstration of product audio features, and yet another such video may provide a demonstration of product appearance features. In such cases, each of the videos can be displayed within the product webpage 110 as described above with respect to the product functioning video 114, where different videos are displayed in response to a user selection 204' of different portions of the product description 113 that correspond to the features demonstrated in the video. For example, a portion of the product description 113 that describes motion or movement of the product 120 can be associated with a product functioning video 114 that shows the product moving. In another example, a different portion of the product description 113 that describes sound or audio generated by the product 120 can be associated with a different product functioning video 114 that provides audio of the product in operation. In yet another example, another portion of the product description 113 that describes the visual appearance of the product 120 can be associated with another product functioning video 114 that shows the relevant appearance of the product. An example process for obtaining and presenting the product functioning video 114 is described with respect to FIG. 3.

Example Video Identification and Presentation Methodology

Figure 3:
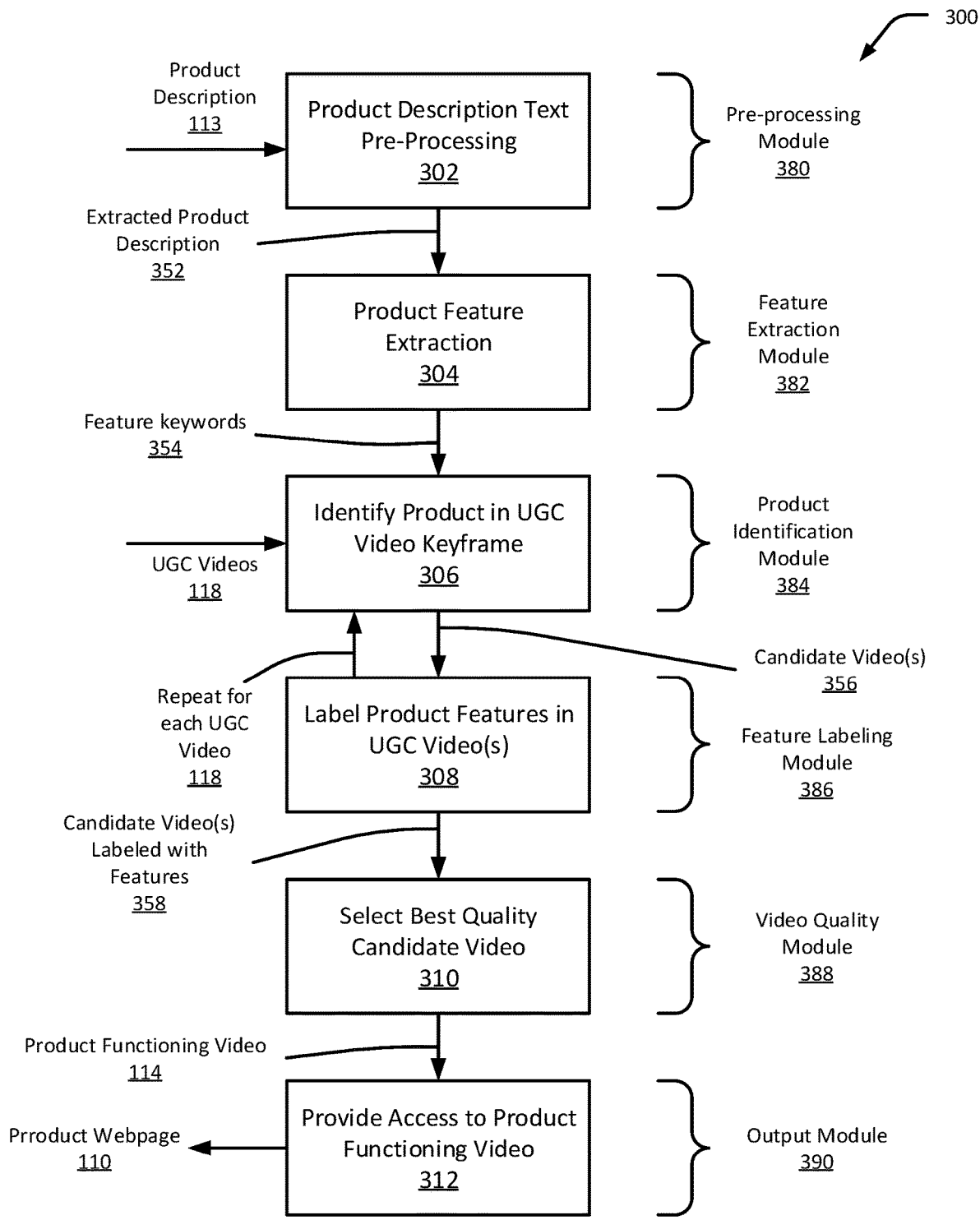
FIG. 3 is a flow diagram of an example process for identifying and presenting video content that correspond to the target product provided by the online product selling system of FIG. 1, in accordance with an embodiment of the present disclosure.

FIG. 3 is a flow diagram of an example process 300 for identifying and presenting videos that correspond to a target product, in accordance with an embodiment of the present disclosure. The process 300, or any portion thereof, can be implemented in the system 100 of FIGS. 1, 6A and 6B. At least some of the operations of the process 300 include processing UGC videos to obtain product functioning videos, while some other operations are performed upon receiving input from a user to present the product functioning videos via a product webpage, such as described above. The operations, functions, or actions described with respect to FIG. 3 can be stored as computer-executable instructions in a non-transitory computer-readable medium, such as a memory and/or a data storage of a computing system. It will be understood that the functions performed in process 300 can be implemented in a differing order. For example, as will be apparent in view of this disclosure, certain functions relating to generating and processing the product functioning videos can be performed independently of other functions relating to presenting the videos. Additionally, or alternatively, two or more operations may be performed at the same time or otherwise in an overlapping contemporaneous fashion.

The process 300 can be performed offline, that is, independently of any action by the seller or the potential buyer of the product 120. For example, the process 300, or any portion thereof, can be performed responsive to receiving the product listing 115 from the seller or responsive to receiving a video uploaded to the media database 106. For instance, the process 300 can process videos in the media database 106 in response to receiving the product listing 115, in response to subsequent updates to the listing, or in response to a new video uploaded to the database at a later time, such as when users upload videos as part of a product review. The process 300 includes pre-processing 302, by a pre-processing module 380, the product description 113 to extract certain descriptive words from the textual product description using a natural language processor. The text can include, for example, the title or name of the product 120, a written description of the product and its features, frequently asked questions and answers about the product, user-written product reviews, and any other textual information that is encoded in the product webpage 110. The extracted text, or portions thereof, is preprocessed by removing words such as pronouns, stop words, and other extraneous words that do not describe features of the product 120. For example, the Natural Language Toolkit (NLTK) open-source libraries can be used to preprocess the text. The pre-processing 302 produces an extracted product description 352 that includes the remaining words from the product description 113 that were not extracted.

The process 300 further includes extracting 304, by a feature extraction module 382, one or more product features from the extracted product description 352 to create feature keywords 354, which are mapped to the UGC videos 118, or portions of those videos, that correspond to the relevant features of the product 120. To extract the product features, the extracted product description 352 is parsed using a part-of-speech (POS) tagger. POS tagging reads text in the extracted product description 352 and assigns parts of speech to each word in the text, such as noun, verb, adjective, pronoun, noun-plural, etc. An example POS tagger that can be used is the Stanford Log-linear Part-Of-Speech Tagger. Each word or sentence in the extracted product description 352 is annotated with a tag that describes the part of speech corresponding to that word or sentence. After the extracted product description 352 is tagged with parts of speech, a term frequency—inverse document frequency (TF-IDF) numerical statistic extracts out important words in the text based on the frequency at which the words appear in the extracted product description 352. The TF-IDF value is designed to reflect the importance of a given word relative to the entire text by increasing the value proportionally to the number of times a given word appears in the extracted product description 352. For example, the TF-IDF($i^{th}$ word in the text)=(the frequency of the $i^{th}$ word in the text)/(the total number of words in the text). Words that have a TF-IDF value below a threshold value are discarded from the extracted product description 352, and the remaining words are relevant to the features of the product 120. In some examples, the feature keywords 354 are obtained by running the tagged noun words/phrases through a supervised classifier trained on the domain features relevant to the product 120, and using a natural language classifier, such as the NLTK library, to find the closeness or similarity of the feature keywords 354 to the product features, such as motion, audio, or appearance. The similarity is represented by a score denoting how similar two words are. In some examples, words that have a similarity score below a threshold value are discarded from the feature keywords 354. Thus, the feature keywords 354 include all words or phrases from the extracted product description 352 that are relevant to the product features. These feature keywords 354 will appear on the product webpage 110 as part of the product description 112.

The process 300 further includes identifying 306, by a product identification module 384, the product 120 in a keyframe of one or more of the UGC videos 118. A keyframe is a single frame of the video 118. Each video 118 can have multiple keyframes, for example, in a video that has been divided into multiple segments, there can be one or more keyframes per segment. In some examples, the keyframe is a frame that defines a starting or ending point of a smooth visual transition between segments of the video. In some embodiments, each UGC video 118 is divided into multiple segments. For example, the video 118 can be divided into five-second long segments, or segments of any user-configurable length of time, including at least one remainder segment that is shorter than the other segments, as the case may be. For example, a 31-second long video can be segmented into six five-second segments and one one-second segment, or other combinations of segments as will be apparent. The length of the segments can be set, for example, by a system administrator or other user who has administrative authority over the system 100. Each of the segments is then separately analyzed to identify the product 120 in a keyframe of the respective segment.

In the case where the UGC videos 118 are not annotated or otherwise labeled with information that identifies the content of the videos, the videos may not have any useful content with respect to demonstrating the features of the product 120. For example, some UGC videos 118 may be primarily focused on subject matter other than the product 120 (such as when the product 120 is incidentally shown) or the videos may not include any images or sounds of the product 120. Furthermore, some UGC videos 118 may include content that is relevant to the features of the product 120, but there may also be portions of the video that are not relevant. Therefore, it is necessary to analyze each segment of each UGC video 118 to determine whether the segment or multiple segments are candidates for the product functioning video 114.

Figure 4A:
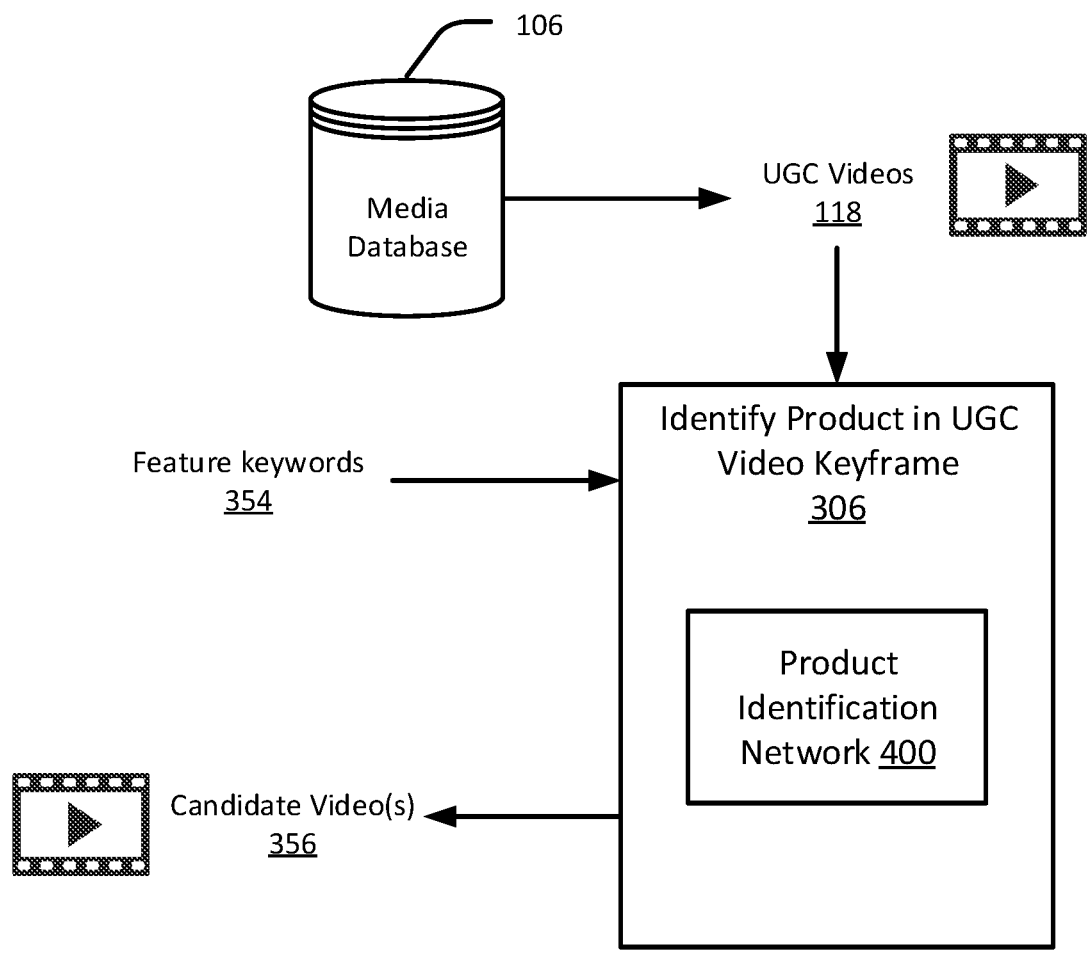
FIGS. 4A-B show the structure of an example product identification network that is a component of the online product selling system of FIG. 1, in accordance with some embodiments of the present disclosure.
Figure 4B:
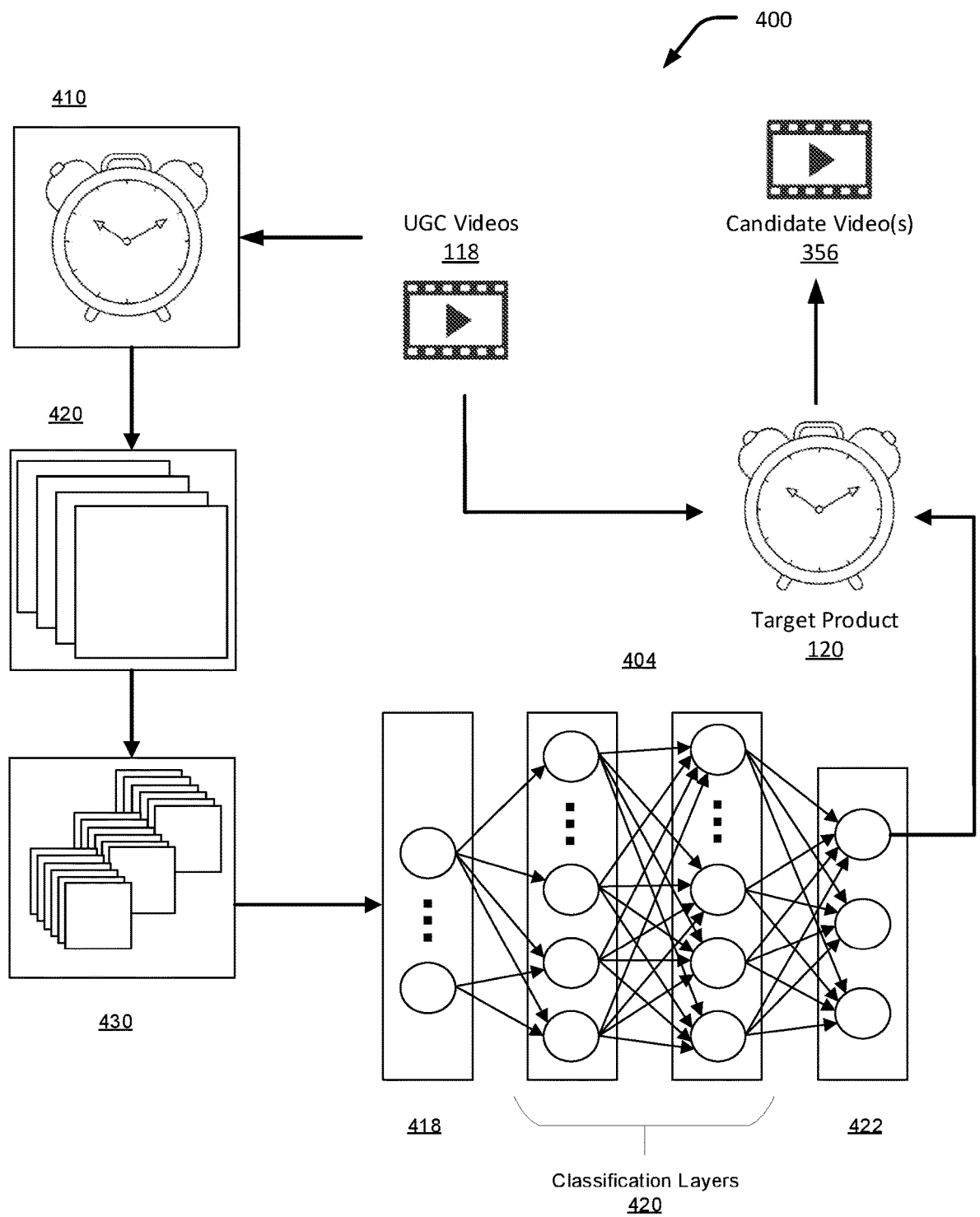

A feature detector is applied to each keyframe of each segment of the UGC video 118. An example of such a feature detector is Oriented FAST (features from accelerated segment test) and rotated BRIEF (Binary Robust Independent Elementary Features), also referred to as ORB feature detector, which is a local feature detector that can be used in computer vision tasks such as object recognition. ORB uses FAST to locate keypoints in the keyframe, and then a Harris corner measure is applied to the keypoints to find the top N points among them. In some examples, a multiscale image pyramid can be used to identify multiscale features in the keyframe by performing ORB on a set of reduced sized versions of the keyframe. In any event, a neural network is applied to the keypoints (or the top N keypoints) to identify the product in the keyframe (if any). In some examples, the neural network is a region based convolutional neural network (R-CNN) trained (or pre-trained) to identify a set of one or more products for sale in an e-commerce environment, such as shown in FIGS. 4A-B. If the neural network identifies the product in the keyframe as being the same or similar to the target product 120, the segment including the keyframe is labeled as containing the product 120. The identifying 306 is repeated for each segment of each UGC video 118 to produce at least one candidate video 356. Each candidate video 356 includes the UGC video(s) 118, or segments thereof, that have been identified (labeled) as including the target product 120.

FIGS. 4A-B show the structure of an example product identification network 402 that is a component of the product selling system 100 of FIG. 1, in accordance with some embodiments of the present disclosure. Specifically, the product identification network 400 employs a neural network structure to classify videos that contain the target product 120. As an illustration and as shown in FIG. 4B, an image 410 (e.g., a keyframe of the UGC video 118 containing an alarm clock) is provided to the network 400. One or more filters are applied to the image 410 by one or more convolutional layers 420, according to some embodiments. More specifically, one or more convolutional layers 420 break down the image 410 into various filtered feature maps that identify locations and relative strengths of detected features in the image. The same filter can be systematically applied across different sections of image 410, which allows for the detection of salient image features regardless of their location in the image 410. In this application, the salient image features are those associated with the category and sub-category of products in the image. For example, the category of the product can include one or more audio features of the product, such as one or more sounds that the product produces while in operation, while the sub-category of the product can include specific types of audio features, such as alarm sounds, notification sounds, operating noise, verbal notifications, different configurable volume levels, or different configurable sets of sounds (such as different spoken languages, different audio themes, etc.). In another example, the category of the product can include one or more motion features of the product, such as one or more movements that the product produces while in operation, while the sub-category of the product can include specific types of motion features, such as the movement of different components of the product, the movement of the product in different operating modes, or different configurable movements of the product. In yet another example, the category of the product can include one or more appearance features of the product, such as lights or visual displays of the product, while the sub-category of the product can include specific types of appearance features, such as different lighting modes, different displayed messages in different operating modes, or different configurable lights or displays.

According to some embodiments, pooling layers 430 are used to further down sample the detected features from the feature maps generated by the convolutional layers 420. In essence, pooling layers 430 operate on the individual feature maps to generate smaller pooled feature maps. The pooled feature maps summarize the feature data from the feature maps. According to some embodiments, the resulting pooled feature maps are more robust to any changes in position of the salient features from the image 410.

Once the feature maps or pooled feature maps have been generated from image 410, the feature map data is fed as input to neural network 404. Neural network 404 includes an input layer 418, one or more product classification layers 420, and an output layer 422. Each of the layers of neural network 404 include neurons that represent mathematical functions and/or weights applied to data received as input to the neuron. The output of a neuron of one layer is received by each of the neurons in the proceeding layer. Accordingly, input layer 418 of neural network 404 can include any number of neurons that receive the image feature data from the pooled feature maps.

According to some embodiments, product classification layers 420 are configured during training of neural network 404 to identify product classifications based on the product features encapsulated in the pooled feature maps. The number of product classification layers 420, the number of neurons in each of the layers, and the function performed by each neuron are established during supervised training as neural network 404 learns how to distinguish between different products. Accordingly, the characteristics (e.g., number of layers, number of neurons in a given layer, etc.) of product classification layers 420 can be different depending on various training factors. According to some embodiments, output layer 422 includes a number of neurons that correspond to the possible product classifications for each identified product in image 410. For example, at least one of the neurons in the output layer corresponds to the product in the input image 410 (e.g., the alarm clock). Thus, the product in the UGC video 118 that is identified by the network 400 as being the target product 120 becomes the candidate video 356.

Referring again to FIG. 3, the process 300 further includes labeling (annotating) 308, by a feature labeling module 386, the candidate video(s) 356 with the feature keywords 354, which represent the product features extracted from the product description 113. For example, each of the candidate videos 356 is analyzed to determine which, if any, product features (e.g., motion, audio, or appearance) are present in the videos, and if so, those candidate videos are labeled as including the corresponding features, such as described with respect to FIG. 5. By labeling the videos with the product feature keywords, the videos can be correlated with the product webpage 110 where the keywords appear in the product description 113. In this manner, videos that are labeled with keywords that match or are similar to the product description 113 can be accessed via the product webpage 110.

Figure 5:
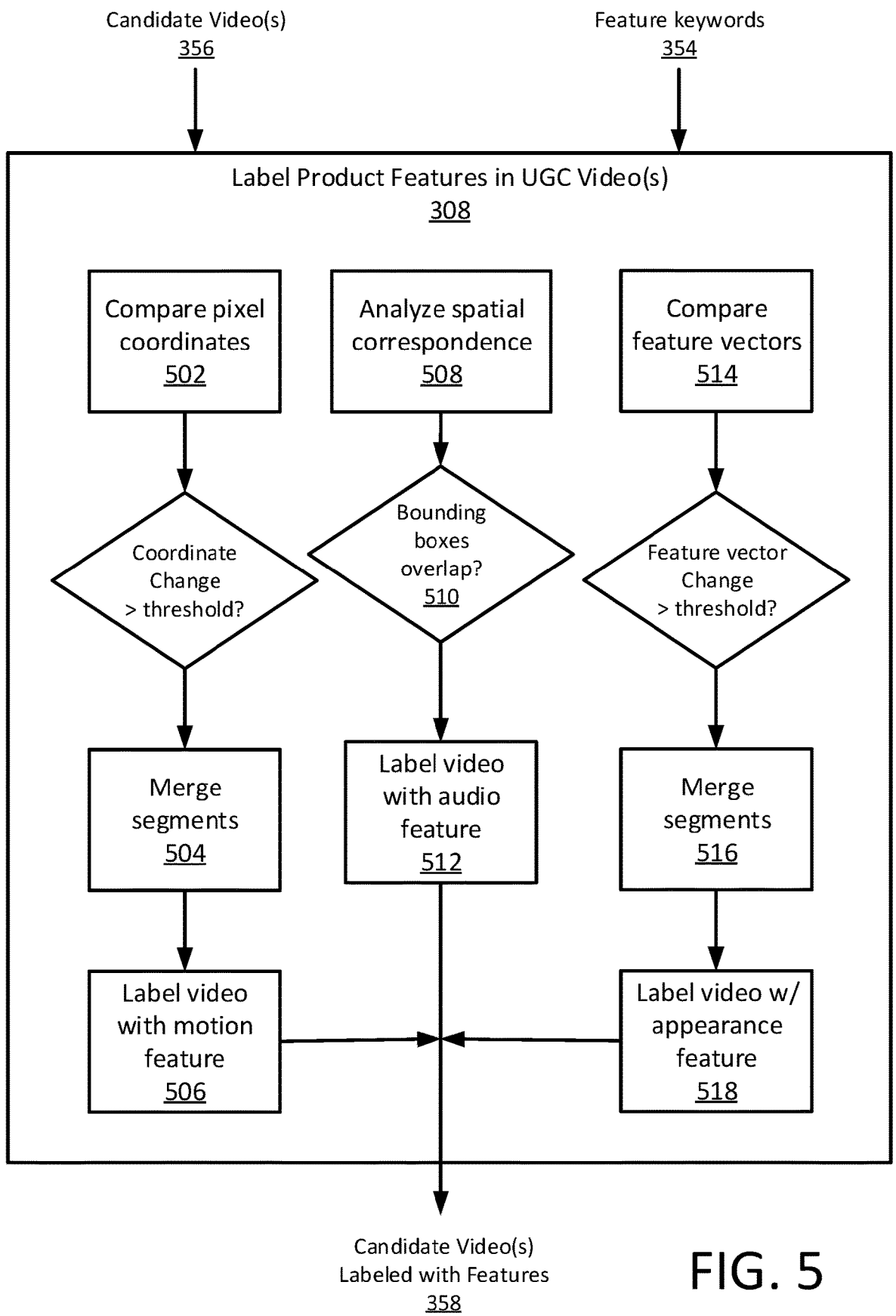
FIG. 5 is a flow diagram of an example process for labeling candidate video(s) of the online product selling system of FIG. 1 with feature keywords, in accordance with an embodiment of the present disclosure.

FIG. 5 is a flow diagram of an example process for labeling 308 the candidate video(s) 356 with the feature keywords 354, in accordance with an embodiment of the present disclosure. The process 308 includes labeling the candidate video 356 as including a motion feature if the (x, y) pixel coordinates of the product in two or more adjacent keyframes of the candidate video changes by more than a threshold value. In other words, the (x, y) pixel coordinates of the product in the keyframes of two or more adjacent video segments are compared 502 and the adjacent segments are merged 504 together if the pixel coordinates change by more than the threshold value. The merged segments of the candidate video 356 are then labeled 506 as including a motion feature of the target product 120. In another example, the candidate video 356 includes audio features if a sound localization technique identifies audio within the same region of a keyframe of the candidate video as the product. For example, a technique that analyzes 508 the spatial correspondence between visual and audio information in the video is used to identify a bounding box, or pixels, in the video frame that indicate the source of the audio. Then a bounding box of the product image in the same video frame is compared to the bounding box of the sound source. If the two bounding boxes overlap 510 more than a threshold value, then the segment of the candidate video 356 is labeled 512 as including an audio feature of the target product 120. In yet another example, the candidate video 356 includes appearance features if one or more feature vectors of the product in two or more adjacent keyframes of the candidate video change by more than a threshold value. The feature vectors are values taken from the output of a neural network layer which represent visual features, such as color and brightness, of the product in the keyframe of the candidate video 356. In other words, the feature vectors of the product in the keyframes of two or more adjacent video segments are compared 514 and the adjacent segments are merged 516 together if the feature vectors change by more than the threshold value. The merged segments of the candidate video 356 are then labeled 518 as including an appearance feature of the target product 120. All of the candidate videos 356 that are labeled as including one or more product features, such as described above, are referred to as candidate video(s) labeled with features 358 in FIG. 3.

Referring again to FIG. 3, the process 300 further includes selecting 310, by a video quality module 388, the best quality candidate video from among all of the candidate videos labeled with features 358. In some embodiments, the best quality candidate video is selected based on aesthetic features, such as visibility of the product in the video, clarity of the video, lighting of the product, sound quality, and/or other factors that are relevant to the appearance and sound of the video. For each of the candidate video(s) labeled with features 358, a weight is assigned based on a percentage of the product that is visible the video keyframe. For example, a weight value is given to videos where the entire product is visible in the keyframe, and videos where the product is partially visible in the keyframe are discarded. Next, an additional weight value is given to videos having a maximum combined aesthetics score for the keyframe(s). For example, a deep learning-based image aesthetics predictor model can be used to assign an image quality measurement to the keyframe(s). An example of such a predictor model is a convolutional neural network (CNN) trained to compute a global aesthetics or quality score according to several aesthetics attributes, such as interesting content, object emphasis, lighting quality, etc. for any input image. In some example, further weight is given to videos having a higher number of user "likes" or preferences on the product webpage 110. The combined weights of each candidate video labeled with features 358 are compared to the combined weights of any other candidate videos, and using a normalized average statistics score, the candidate video labeled with features 358 having the maximum score is selected as the best quality candidate video. Each of the best quality candidate videos are then used as the product functioning video 114 for the product webpage 110.

The process 300 further includes providing 312, by an output module 390, access to the product functioning video 114 via the product webpage 110. For example, such as described with respect to FIG. 2C, the product functioning video 114 is displayed when the user selects highlighted text in the product description 113 of the product webpage 110. If the product functioning video 114 is labeled as including an audio feature, then portions of the product description 113 describing audio or sound are highlighted and hyperlinked to the product functioning video 114. If the product functioning video 114 is labeled as including a motion feature, then portions of the product description 113 describing motion are highlighted and hyperlinked to the product functioning video 114. If the product functioning video 114 is labeled as including an appearance feature, then portions of the product description 113 describing appearance or look are highlighted and hyperlinked to the product functioning video 114.

Figure 6A:
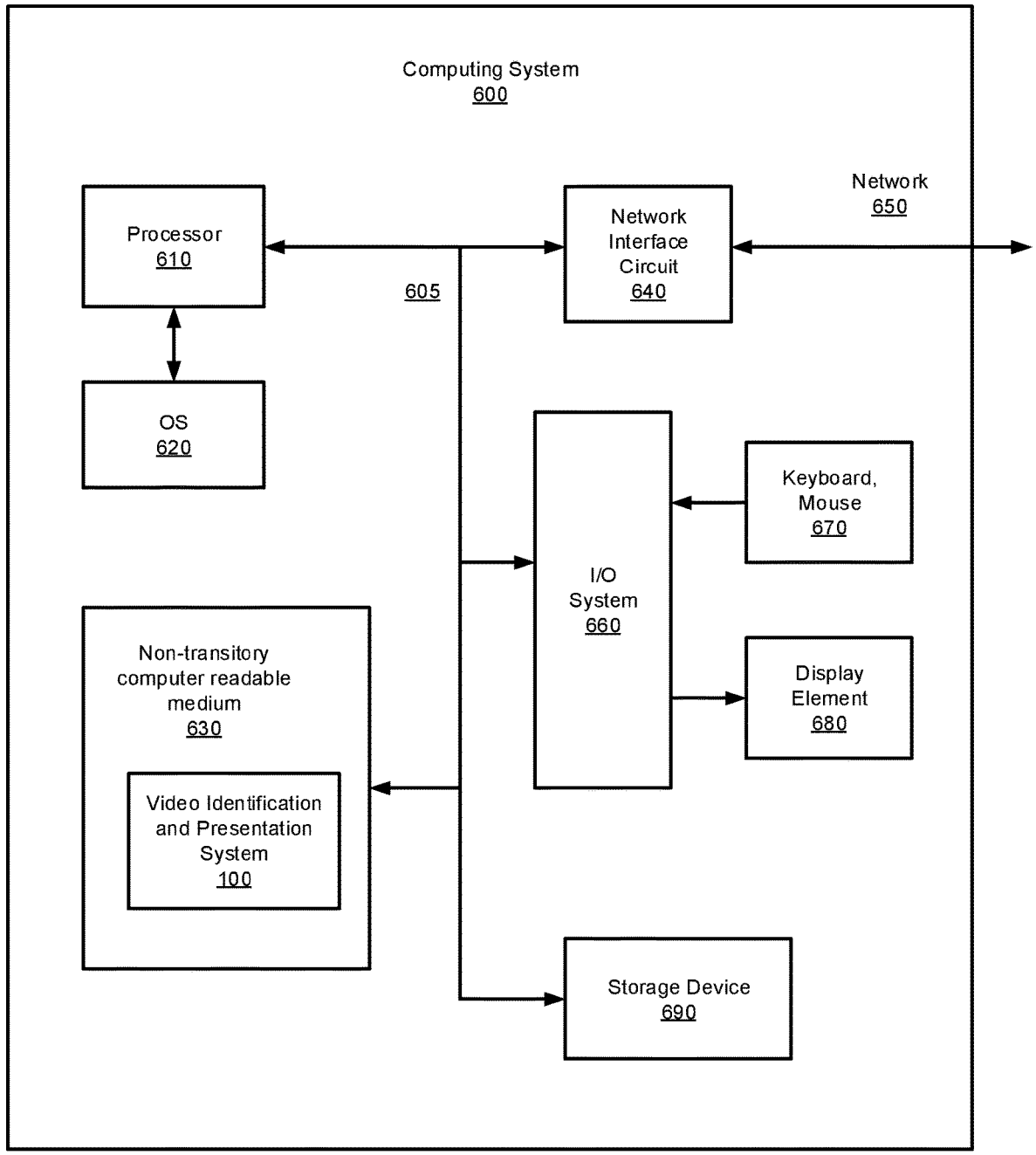
FIGS. 6A-B are block diagrams schematically illustrating a computing system configured to identify and present video content that corresponds to a target product provided by an online product selling system, in accordance with an embodiment of the present disclosure.
Figure 6B:
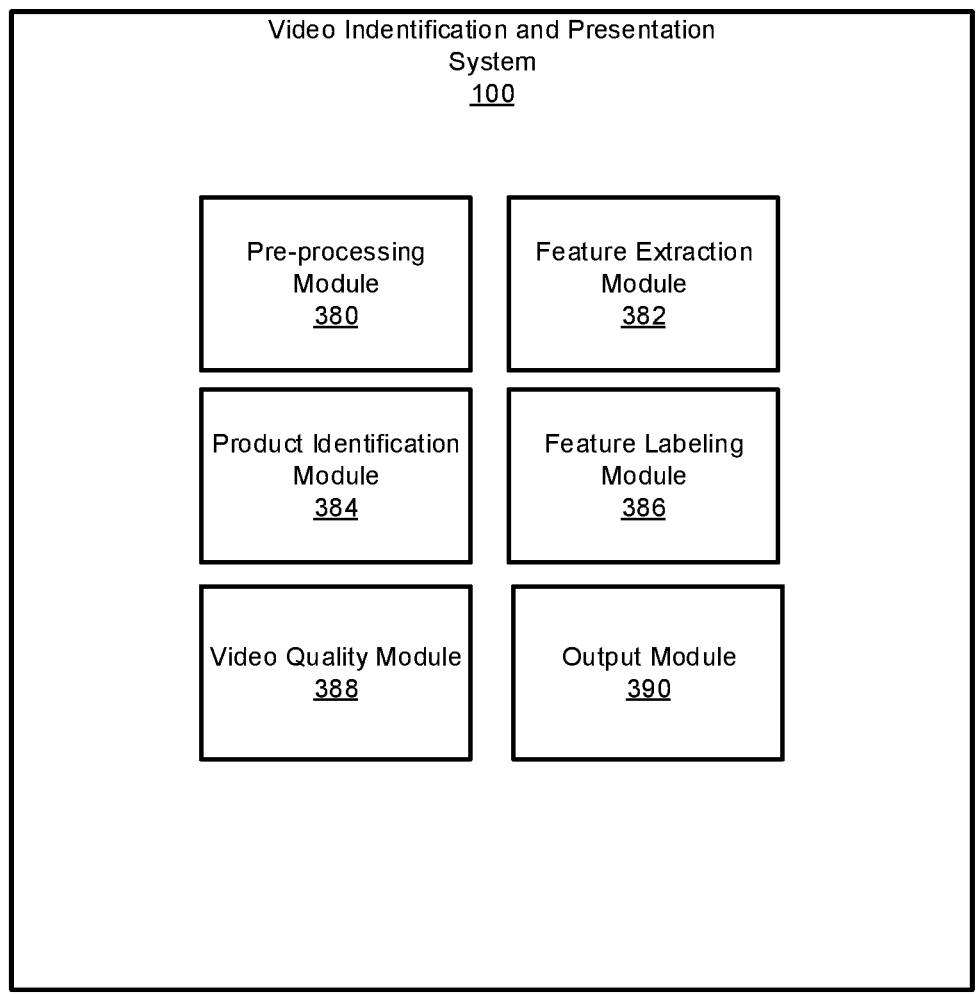

FIGS. 6A-B are block diagrams schematically illustrating a computing system 600 configured to perform any of the techniques as variously described in this disclosure, in accordance with an embodiment of the present disclosure. For example, in some embodiments, the product selling system 100 of FIG. 1, or any portions thereof as illustrated in FIGS. 2A-F, and the methodology of FIGS. 3-5, are implemented in the computing system 600 of FIG. 6A. In some embodiments, the computing system 600 is a computer system, such as a workstation, desktop computer, server, laptop, handheld computer, tablet computer (e.g., the iPad tablet computer), mobile computing or communication device (e.g., the iPhone mobile communication device, the Android mobile communication device, and the like), or other form of computing device that has sufficient processor power and memory capacity to perform the operations described in this disclosure. In some embodiments, a distributed computational system is provided comprising a plurality of such computing devices.

The computing system 600 includes one or more storage devices 690 and/or non-transitory computer-readable media 630 having encoded thereon one or more computer-executable instructions or software for implementing techniques as variously described in this disclosure. In some embodiments, the storage devices 690 include a computer system memory or random-access memory, such as a durable disk storage (e.g., any suitable optical or magnetic durable storage device, including RAM, ROM, Flash, USB drive, or other semiconductor-based storage medium), a hard-drive, CD-ROM, or other computer readable media, for storing data and computer-readable instructions and/or software that implement various embodiments as taught in this disclosure. In some embodiments, the storage device 690 includes other types of memory as well, or combinations thereof. In one embodiment, the storage device 690 is provided on the computing system 600. In another embodiment, the storage device 690 is provided separately or remotely from the computing system 600. The non-transitory computer-readable media 630 include, but are not limited to, one or more types of hardware memory, non-transitory tangible media (for example, one or more magnetic storage disks, one or more optical disks, one or more USB flash drives), and the like. In some embodiments, the non-transitory computer-readable media 630 included in the computing system 600 store computer-readable and computer-executable instructions or software for implementing various embodiments. In one embodiment, the computer-readable media 630 are provided on the computing system 600. In another embodiment, the computer-readable media 630 are provided separately or remotely from the computing system 600.

The computing system 600 also includes at least one processor 610 for executing computer-readable and computer-executable instructions or software stored in the storage device 690 and/or non-transitory computer-readable media 630 and other programs for controlling system hardware. In some embodiments, virtualization is employed in the computing system 600 so that infrastructure and resources in the computing system 600 are shared dynamically. For example, a virtual machine is provided to handle a process running on multiple processors so that the process appears to be using only one computing resource rather than multiple computing resources. In some embodiments, multiple virtual machines are used with one processor.

As can be further seen, a bus or interconnect 605 is also provided to allow for communication between the various components listed above and/or other components not shown. Computing system 600 can be coupled to a network 650 (e.g., a local or wide area network such as the internet), through network interface circuit 640 to allow for communications with other computing devices, platforms, resources, clients, and Internet of Things (IoT) devices.

In some embodiments, a user interacts with the computing system 600 through an input/output system 660 that interfaces with devices such as a keyboard and mouse 670 and/or a display element (screen/monitor) 680. The keyboard and mouse may be configured to provide a user interface to accept user input and guidance, and to otherwise control the product selling system 100. The display element may be configured, for example, to display the recommended images using the disclosed techniques. In some embodiments, the computing system 600 includes other I/O devices (not shown) for receiving input from a user, for example, a pointing device or a touchpad, etc., or any suitable user interface. In some embodiments, the computing system 600 includes other suitable conventional I/O peripherals. The computing system 600 can include and/or be operatively coupled to various suitable devices for performing one or more of the aspects as variously described in this disclosure.

In some embodiments, the computing system 600 runs an operating system (OS) 620, such as any of the versions of Microsoft Windows operating systems, the different releases of the Unix and Linux operating systems, any version of the MacOS for Macintosh computers, any embedded operating system, any real-time operating system, any open source operating system, any proprietary operating system, any operating systems for mobile computing devices, or any other operating system capable of running on the computing system 600 and performing the operations described in this disclosure. In one embodiment, the operating system runs on one or more cloud machine instances.

As will be appreciated in light of this disclosure, the various modules and components of the system, as shown in FIG. 6B, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transitory memory or set of memories) including one or more non-transitory machine-readable mediums encoded with instructions that when executed by one or more processors, cause the various methodologies provided in this disclosure to be carried out. In an embodiment, the product selling system 100 includes the pre-processing module 380, the feature extraction module 382, the product identification module 384, the feature labeling module 386, the video quality module 388, the output module 390 of FIG. 3, or any combination thereof. It will be appreciated that, in some embodiments, various functions and data transformations performed by the computing system, as described in this disclosure, can be performed by similar processors in different configurations and arrangements, and that the depicted embodiments are not intended to be limiting. Various components of this example embodiment, including the computing system 600, can be integrated into, for example, one or more desktop or laptop computers, workstations, tablets, smart phones, game consoles, set-top boxes, or other such computing devices. Other componentry and modules typical of a computing system, such as, for example a co-processor, a processing core, a graphics processing unit, a touch pad, a touch screen, etc., are not shown but will be readily apparent.

In other embodiments, the functional components/modules are implemented with hardware, such as gate level logic (e.g., FPGA) or a purpose-built semiconductor (e.g., ASIC). Still other embodiments are implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

Further Example Embodiments

Example 1 provides a method for identifying and presenting a product video. The method includes identifying, by a product identification module and using a neural network trained to identify a set of one or more products, a target product in a keyframe of one or more user-generated content videos to produce at least one candidate video; labeling, by a feature labeling module and using at least one keyframe of the at least one candidate video, the at least one candidate video with one or more feature keywords extracted from a product description of the target product to produce at least one candidate video labeled with features; selecting, by a video quality module and using a deep learning-based image aesthetics predictor model, at least one best quality candidate video labeled with features from the at least one candidate video labeled with features; and providing access to at least a portion of the at least one best quality candidate video labeled with features via a product webpage having the one or more feature keywords.

Example 2 includes the subject matter of Example 1, further including extracting, by a pre-processing module and using a natural language processor, one or more descriptive words from the product description of the target product to produce an extracted product description, wherein the one or more feature keywords are based on the extracted product description.

Example 3 includes the subject matter of Example 2, further including extracting, by a feature extraction module and using a part-of-speech tagger, one or more product features from the extracted product description to produce the one or more feature keywords.

Example 4 includes the subject matter of any of Examples 1-3, wherein the target product is identified in the keyframe of the one or more user-generated content videos using a region based convolutional neural network (R-CNN) trained to identify the set of products.

Example 5 includes the subject matter of any of Examples 1-4, further including dividing the at least one best quality candidate video labeled with features into at least one segment, wherein the portion of the at least one best quality candidate video labeled with features includes at least one segment of the at least one best quality candidate video labeled with features including the keyframe.

Example 6 includes the subject matter of any of Examples 1-5, wherein the labeling comprises labeling the at least one candidate video as including: a motion feature if (x,y) pixel coordinates of the target product in two or more adjacent keyframes of the at least one candidate video changes by more than a threshold value; an audio feature if a sound localization technique identifies audio within a same region of a keyframe of the at least one candidate video as the target product; and/or an appearance feature if one or more feature vectors of the target product in the two or more adjacent keyframes of the at least one candidate video change by more than a threshold value.

Example 7 includes the subject matter of Example 6, further including dividing the at least one candidate video labeled with features into at least one segment, wherein the at least a portion of the at least one best quality candidate video labeled with features includes the at least one segment of the at least one candidate video labeled as including a motion feature, an audio feature, and/or an appearance feature.

Example 8 includes the subject matter of any of Examples 1-7, wherein providing access to at least a portion of the at least one best quality candidate video labeled with features via the product webpage includes adding a hyperlink from the one or more feature keywords in the product description to the at least a portion of the at least one best quality candidate video labeled with features, and user selection of the hyperlink causes playback of the at least a portion of the at least one best quality candidate video labeled with features within the product webpage.

Example 9 provides a system for identifying and presenting a product video. The system includes a pre-processing module configured to extract one or more descriptive words from a product description of a target product to produce an extracted product description; a feature extraction module configured to extract one or more product features from the extracted product description to produce one or more feature keywords; a product identification module configured to identify the target product in a keyframe of one or more user-generated content videos to produce at least one candidate video; a feature labeling module configured to label the at least one candidate video with the one or more feature keywords to produce at least one candidate video labeled with features; a video quality module configured to select at least one best quality candidate video labeled with features from the at least one candidate video labeled with features using a deep learning-based image aesthetics predictor model; and an output module configured to provide access to at least a portion of the at least one best quality candidate video labeled with features via an interactive element of a product webpage having the one or more feature keywords.

Example 10 includes the subject matter of Example 9, wherein the one or more descriptive words and/or the one or more feature keywords are extracted from the product description using a natural language processor and/or using a part-of-speech tagger.

Example 11 includes the subject matter of any of Examples 9 and 10, wherein the target product is identified in the keyframe of the one or more user-generated content videos using a region based convolutional neural network (R-CNN) trained to identify a set of products for sale in an e-commerce environment.

Example 12 includes the subject matter of any of Examples 9-11, further including dividing the at least one candidate video labeled with features into at least one segment having a user-configurable length, wherein the labeling comprises labeling the at least one candidate video as including: a motion feature if (x,y) pixel coordinates of the target product in two or more adjacent keyframes of the at least one candidate video changes by more than a threshold value; an audio feature if a sound localization technique identifies audio within a same region of a keyframe of the at least one candidate video as the target product; and an appearance feature if one or more feature vectors of the target product in the two or more adjacent keyframes of the at least one candidate video change by more than a threshold value, and wherein the at least a portion of the at least one best quality candidate video labeled with features includes the at least one segment of the at least one candidate video labeled as including a motion feature, an audio feature, and/or an appearance feature.

Example 13 includes the subject matter of Example 12, wherein providing access to at least a portion of the at least one best quality candidate video labeled with features includes generating a hyperlink in the product webpage from at least one portion of the product description including the one or more feature keywords describing the motion feature, the audio feature, and/or the sound feature to the at least a portion of the at least one best quality candidate video labeled with features.

Example 14 includes the subject matter of Example 13, wherein the at least a portion of the at least one best quality candidate video labeled with features is played in response to a user input selecting the hyperlink, and wherein the selecting includes clicking on the hyperlink or hovering over the hyperlink.

Example 15 provides a computer program product including one or more non-transitory machine-readable mediums encoded with instructions that when executed by one or more processors cause a process to be carried out for identifying and presenting a product video, the process comprising extracting one or more descriptive words from a product description of a target product to produce an extracted product description; extracting one or more product features from the extracted product description to produce one or more feature keywords; identifying the target product in a keyframe of one or more user-generated content videos to produce at least one candidate video; labeling the at least one candidate video with the one or more feature keywords to produce at least one candidate video labeled with features; selecting at least one best quality candidate video labeled with features from the at least one candidate video labeled with features using a deep learning-based image aesthetics predictor model; and providing access to at least a portion of the at least one best quality candidate video labeled with features via a product webpage having the one or more feature keywords.

Example 16 includes the subject matter of Example 15, wherein the one or more product features and/or the one or more feature keywords are extracted from the extracted product description using a natural language processor and/or using a part-of-speech tagger.

Example 17 includes the subject matter of any of Examples 15 and 16, wherein the target product is identified in the keyframe of the one or more user-generated content videos using a region based convolutional neural network (R-CNN) trained to identify a set of one or more products for sale in an e-commerce environment.

Example 18 includes the subject matter of any of Examples 15-17, wherein the labeling comprises labeling the at least one candidate video as including a motion feature if (x,y) pixel coordinates of the target product in two or more adjacent keyframes of the candidate video changes by more than a threshold value.

Example 19 includes the subject matter of any of Examples 15-18, wherein the labeling comprises labeling the at least one candidate video as including an audio feature if a sound localization technique identifies audio within a same region of a keyframe of the at least one candidate video as the target product.

Example 20 includes the subject matter of any of Examples 15-19, wherein the labeling comprises labeling the at least one candidate video as including an appearance feature if one or more feature vectors of the target product in two or more adjacent keyframes of the at least one candidate video change by more than a threshold value.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

Numerous specific details have been set forth herein to provide a thorough understanding of the embodiments. It will be appreciated, however, that the embodiments may be practiced without these specific details. In other instances, well known operations, components and circuits have not been described in detail so as not to obscure the embodiments. It can be further appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A method for identifying and presenting a product video, the method comprising:
   identifying, by a product identification module and using a neural network trained to identify a set of one or more products, a target product in a keyframe of one or more user-generated content videos to produce at least one candidate video;
   labeling, by a feature labeling module and using at least one keyframe of the at least one candidate video, the at least one candidate video with one or more feature keywords extracted from a product description of the target product to produce at least one candidate video labeled with features;
   selecting, by a video quality module and using a deep learning-based image aesthetics predictor model, at least one best quality candidate video labeled with features from the at least one candidate video labeled with features; and
   providing access to at least a portion of the at least one best quality candidate video labeled with features via a product webpage having the one or more feature keywords.

2. The method of claim 1, further comprising extracting, by a pre-processing module and using a natural language processor, one or more descriptive words from the product description of the target product to produce an extracted product description, wherein the one or more feature keywords are based on the extracted product description.

3. The method of claim 2, further comprising extracting, by a feature extraction module and using a part-of-speech tagger, one or more product features from the extracted product description to produce the one or more feature keywords.

4. The method of claim 1, wherein the target product is identified in the keyframe of the one or more user-generated content videos using a region based convolutional neural network (R-CNN) trained to identify the set of products.

5. The method of claim 1, further comprising dividing the at least one best quality candidate video labeled with features into at least one segment, wherein the portion of the at least one best quality candidate video labeled with features includes at least one segment of the at least one best quality candidate video labeled with features including the keyframe.

6. The method of claim 1, wherein the labeling comprises labeling the at least one candidate video as including:
   a motion feature if (x, y) pixel coordinates of the target product in two or more adjacent keyframes of the at least one candidate video changes by more than a threshold value;
   an audio feature if a sound localization technique identifies audio within a same region of a keyframe of the at least one candidate video as the target product; and/or
   an appearance feature if one or more feature vectors of the target product in the two or more adjacent keyframes of the at least one candidate video change by more than a threshold value.

7. The method of claim 6, further comprising dividing the at least one candidate video labeled with features into at least one segment, wherein the at least a portion of the at least one best quality candidate video labeled with features includes the at least one segment of the at least one candidate video labeled as including a motion feature, an audio feature, and/or an appearance feature.

8. The method of claim 1, wherein providing access to at least a portion of the at least one best quality candidate video labeled with features via the product webpage includes adding a hyperlink from the one or more feature keywords in the product description to the at least a portion of the at least one best quality candidate video labeled with features, and user selection of the hyperlink causes playback of the at least a portion of the at least one best quality candidate video labeled with features within the product webpage.

9. A system for identifying and presenting a product video, the system comprising:
   a pre-processing module configured to extract one or more descriptive words from a product description of a target product to produce an extracted product description;
   a feature extraction module configured to extract one or more product features from the extracted product description to produce one or more feature keywords;
   a product identification module configured to identify the target product in a keyframe of one or more user-generated content videos to produce at least one candidate video;
   a feature labeling module configured to label the at least one candidate video with the one or more feature keywords to produce at least one candidate video labeled with features;
   a video quality module configured to select at least one best quality candidate video labeled with features from the at least one candidate video labeled with features using a deep learning-based image aesthetics predictor model; and
   an output module configured to provide access to at least a portion of the at least one best quality candidate video labeled with features via an interactive element of a product webpage having the one or more feature keywords.

10. The system of claim 9, wherein the one or more descriptive words are extracted from the product description using a natural language processor and/or using a part-of-speech tagger.

11. The system of claim 9, wherein the target product is identified in the keyframe of the one or more user-generated content videos using a region based convolutional neural network (R-CNN) trained to identify a set of products for sale in an e-commerce environment.

12. The system of claim 9, further comprising dividing the at least one candidate video labeled with features into at least one segment having a user-configurable length, wherein the labeling comprises labeling the at least one candidate video as including:
   a motion feature if (x, y) pixel coordinates of the target product in two or more adjacent keyframes of the at least one candidate video changes by more than a threshold value;

an audio feature if a sound localization technique identifies audio within a same region of a keyframe of the at least one candidate video as the target product; and an appearance feature if one or more feature vectors of the target product in the two or more adjacent keyframes of the at least one candidate video change by more than a threshold value, and wherein the at least a portion of the at least one best quality candidate video labeled with features includes the at least one segment of the at least one candidate video labeled as including a motion feature, an audio feature, and/or an appearance feature.

13. The system of claim 12, wherein providing access to at least a portion of the at least one best quality candidate video labeled with features includes generating a hyperlink in the product webpage from at least one portion of the product description including the one or more feature keywords describing the motion feature, the audio feature, and/or the sound feature to the at least a portion of the at least one best quality candidate video labeled with features.

14. The system of claim 13, wherein the at least a portion of the at least one best quality candidate video labeled with features is played in response to a user input selecting the hyperlink, and wherein the selecting includes clicking on the hyperlink or hovering over the hyperlink.

15. A computer program product including one or more non-transitory machine-readable mediums encoded with instructions that when executed by one or more processors cause a process to be carried out for identifying and presenting a product video, the process comprising:

extracting one or more descriptive words from a product description of a target product to produce an extracted product description;

extracting one or more product features from the extracted product description to produce one or more feature keywords;

identifying the target product in a keyframe of one or more user-generated content videos to produce at least one candidate video;

labeling the at least one candidate video with the one or more feature keywords to produce at least one candidate video labeled with features;

selecting at least one best quality candidate video labeled with features from the at least one candidate video labeled with features using a deep learning-based image aesthetics predictor model; and providing access to at least a portion of the at least one best quality candidate video labeled with features via a product webpage having the one or more feature keywords.

16. The computer program product of claim 15, wherein the one or more product features are extracted from the extracted product description using a natural language processor and/or using a part-of-speech tagger.

17. The computer program product of claim 15, wherein the target product is identified in the keyframe of the one or more user-generated content videos using a region based convolutional neural network (R-CNN) trained to identify a set of one or more products for sale in an e-commerce environment.

18. The computer program product of claim 15, wherein the labeling comprises labeling the at least one candidate video as including a motion feature if (x, y) pixel coordinates of the target product in two or more adjacent keyframes of the candidate video changes by more than a threshold value.

19. The computer program product of claim 15, wherein the labeling comprises labeling the at least one candidate video as including an audio feature if a sound localization technique identifies audio within a same region of a keyframe of the at least one candidate video as the target product.

20. The computer program product of claim 15, wherein the labeling comprises labeling the at least one candidate video as including an appearance feature if one or more feature vectors of the target product in two or more adjacent keyframes of the at least one candidate video change by more than a threshold value.

* * * * *